United States Patent [19]

Gonokami et al.

[11] Patent Number: 5,231,533
[45] Date of Patent: Jul. 27, 1993

[54] NONLINEAR OPTICAL ELEMENT AND USES THEREOF

[75] Inventors: Makoto Gonokami, Yokohama; Kenji Takeda, Tsuchiura; Eiichi Hanamura, Tokyo; Yoshinori Tokura, Chofu, all of Japan

[73] Assignee: Japan Synthetic Rubber Co., Ltd., Tokyo, Japan

[21] Appl. No.: 834,799

[22] Filed: Feb. 13, 1992

[30] Foreign Application Priority Data

Feb. 15, 1991 [JP] Japan ................... 3-42241

[51] Int. Cl.$^5$ .................. H01S 3/10; H01S 3/108; H01S 3/098
[52] U.S. Cl. .................. 359/328; 359/326; 359/342; 372/18; 372/21
[58] Field of Search ............... 359/326, 327, 342, 328, 359/329; 372/18, 21, 22

[56] References Cited

U.S. PATENT DOCUMENTS

| | | | |
|---|---|---|---|
| 4,597,638 | 7/1986 | Chemla et al. | 359/244 |
| 4,803,688 | 2/1989 | Lawandy | 372/21 |
| 4,986,635 | 1/1991 | Spry | 359/886 |
| 5,002,369 | 3/1991 | Sakata | 359/241 |
| 5,023,139 | 6/1991 | Birnboim et al. | 428/402 |

OTHER PUBLICATIONS

"Laser emission from individual droplets at wavelengths corresponding to morphology-dependent resonances," H.-M. Tzeng, et al., Optics Letters, vol. 9, No. 11, Nov. 1984, pp. 499-501.
"Some characteristics of a droplet whispering-galley-mode laser," H.-B. Lin et al., Optics Letters, vol. 11, No. 10, Oct. 1986, pp. 614-616.
"Effect of the pumping geometry on the half-widths of the lasing peaks observed from Rhodamine 6G ethanol droplets," J. C. Knight et al., Optics Letters, vol. 15, No. 17, Sep. 1, 1990, pp. 980-982.
"Observation of Structure Resonances in the Fluorescence Spectra from Microspheres," R. E. Benner et al., Physical Review Letters, vol. 44, No. 7, Feb. 18, 1980, pp. 475-478.
"Multiorder Stokes Emission from Micrometer-Size Droplets," Shi-Xiong Qian et al., Physical Review Letters, vol. 56, No. 9, Mar. 3, 1986, pp. 926-929.
"Quality-Factor and Nonlinear Properties of Optical Whispering-Galley Modes," V. B. Braginsky, et al., Physics Letters A, vol. 137, No. 7,8, May 29, 1989, pp. 393-397.
"Stimulated Emission into Optical Whispering Modes of Spheres," C. G. B. Garrett, et al., Physical Review, vol. 124, No. 6, Dec. 15, 1961, pp. 1807-1809.
"Continuous-wave laser oscillation in a Nd:YAG sphere," T. Baer, Optics Letters, vol. 12, No. 6, Jun. 1987, pp. 392-394.
"Time-resolved spectroscopy of laser emission from dye-doped droplets," A. Biswas et al., Optics Letters, vol. 14, No. 4, Feb. 15, 1989, pp. 214-216.
"Optical bistability of an aqueous aerosol particle detected through light scattering: theory and experiement," S. Arnold et al., Applied Optics, vol. 29, No. 24, Aug. 20, 1990, pp. 3473-3478.

(List continued on next page.)

Primary Examiner—Ian J. Lobo
Attorney, Agent, or Firm—Finnegan, Henderson, Farabow, Garrett & Dunner

[57] ABSTRACT

The nonlinear optical element includes a sunstrate and one or more transparent microspheres made of a nonlinear optical active substance system fixed to the substrate, or the nonlinear optical element includes one or more transparent microspheres contacting a solid medium and fixed to the substrate. The element can be used for controlling nonlinear optical characteristics such as light amplification, optical switching, injection mode locking, and coupling of whispering gallery modes.

28 Claims, 15 Drawing Sheets

OTHER PUBLICATIONS

"Cavity Quantum Electrodynamic Enhancement of Stimulated Emission in Microdroplets," A. J. Campillo et al., Physical Review Letters, vol. 67, No. 4, Jul. 22, 1991, pp. 437–440.

"Observation of Intermode Correlation in Whispering Galley Mode Laser with Dye Doped Polystyrene Micro Sphere," M. Kuwata-Gonokami et al., Tenicols '91, Dixieme Conference Internationale de Spectroscopie Laser, Font-Romeu France, Jun. 17–21, 1991.

"Laser Emission from Dye-Doped Polystyrene Microsphere," M. Kuwata-Gonokami et al., Jpn. J. Appl. Phys. vol. 31, Part 2, No. 2A, Feb. 1, 1992, pp. L168–L170.

Preprint of Spring Sectional Meeting, 1991, of the Japan Society of Physics, held Mar. 24–27, 1991, vol. 2, Report No. 25-X-11, "Laser Oscillation in a Dye-doped Polystyrene Sphere," H. Yasuda, p. 923.

Preprint of 38th Spring Meeting, 1991, of Japan Society of Physics, Mar. 28–31, 1991, vol. 3, Report No. 30p–F-4, "Laser Oscillation in a doped small polymer sphere," M. Kuwata-Gonokami et al. p. 923.

Preprint of 46th Annual Meeting, 1991, of the Japan Society of Physics, Sep. 27–30, 1991, Report No. 27p–R-15, "Photon trapping and Lasing in Dye-doped Micro Polymer Sphere," Univ. of Tokoyo, JSR, M. Kuwata-Gonokami et al.

Preprint of 49th JOEM Meeting, 1991, of the Japanese Research Association for Organic Electronics Materials, Nov. 18, 1991, "Laser Emission from Dye-doped Polymer Microsphere," p. 8.

NONLINEAR OPTICAL ELEMENT AND USES THEREOF

BACKGROUND OF THE INVENTION

1. Field of the Invention

The present invention relates to a nonlinear optical element and more particularly to the one which can be used as devices in light-(electromagnetic wave-) related fields, that is, optical and optoelectronic fields. Also, the present invention relates to uses of such a nonlinear optical element.

2. Description of the Prior Art

Optical information processing or optical communication at higher speeds and higher densities must necessarily require the use of nonlinear optical elements, and research and development of materials having higher nonlinear optical susceptibilities are now widely under way.

Various methods have been used for controlling the form of such materials with view to fabricating devices therefrom, which methods include (1) crystal growth methods in which large single crystals, single thin film crystals, etc. are formed; and (2) thin film formation methods such as Langmuir-Brodget (BL) method, vacuum vapor deposition method, spincoating method, and the like.

While the aforementioned methods (1) and (2) are currently most commonly used, they remain to merely change the form of the materials to ones suitable for the purposes for which they are used; the performance of the devices fabricated depends on the nonlinear optical characteristics intrinsic to the materials used. Therefore, it is practically very difficult to obtain nonlinear optical elements with higher speeds and higher densities because development of optical materials having higher nonlinear susceptibilities seems rather stagnant at present.

One approach for solving the aforementioned problem is to utilize spherical microcavities made of conventional nonlinear optical materials, exhibiting photoconfinement effect, with view to inducing nonlinear optical phenomena at low thresholds.

Studies on the confinement of light with a certain wavelength into a microsphere with a diameter of about several tens microns ($\mu$) and lasing using such a system have been made focusing on liquid droplets. Opt. Lett., 9, 499 (1984); Opt. Lett., 11, 614 (1986); and Opt. Lett., 15, 980 (1990) describe dependence of the confinement of light into liquid droplet microspheres containing a dye and lasing therefrom on the size of the microspheres as well as thresholds therefor. Because of their free adjustability for diameter or size to any desired values and of their ease of changing the concentration of the dye, liquid droplets are useful as a sample for fundamental measurements. However, they are unsuitable for fabricating devices therewith because they lack a permanent stability.

On the other hand, some studies have been made on solid microspheres.

(1) In Phys. Rev. Lett., 44, 475 (1980) there is a report on the study of confinement of light into a polystyrene microsphere containing a fluorescent dye. However, no mention is made therein of nonlinear optical phenomena including lasing. Measurements were made of a population of the microspheres suspended and buoyant in a liquid medium. Therefore, this system, like the liquid droplets, is unsuitable for application to fabricating optical devices.

(2) Phys. Lett. A, 137, 393 (1989) describes the efficiency of confinement of light into a quartz microsphere, calculation of the threshold value of optical bistability and some experimental results. In this study, the quartz microsphere is set on a small quartz stem for the convenience of measurements to avoid influences of heat thereon but no idea on the fabrication of optical devices is found. Furthermore, all optical bistable phenomenon has not been observed on quartz which constitutes the aforementioned optical system singly, resulting in that no effective nonlinear optical element has yet been established using quartz alone.

As described above, photoconfinement effects with microspheres have been studied mainly by conducting measurements on a population of buoyant microspheres. As far as is known, it has not been intended to fix or immobilize microspheres for fabricating optical devices excepting for merely conducting fundamental measurements of the optical characteristics of a microsphere itself.

SUMMARY OF THE INVENTION

Under the circumstances, the present invention has been made.

It is an object of the present invention to provide a nonlinear optical element which has high nonlinear optical characteristics and high versatility and which can be used in the field of optics and optoelectronics.

It is another object of the present invention to provide a method of enhancing the intensity of light utilizing such an optical element.

As a result of intensive investigation, it has now been found that provision of at least one transparent microsphere, and at least one nonlinear optical active region and at least one light reflection region to form a nonlinear optical unit, and fixation of such an optical unit to a substrate gives rise to a nonlinear optical element which can exhibit various nonlinear optical phenomena depending on a varied intensity of incident light and which can operate at low energy levels.

Therefore, according to the first aspect of the present invention, a nonlinear optical element comprises:

(a) a substrate;

(b) at least one transparent microsphere; the transparent microsphere having a surface and fixed to the substrate;

(c) at least one nonlinear optical active region associated with the at least one transparent microsphere; and (d) at least one light reflection region associated with the at least one transparent microsphere, the light reflection region having an interface and at least a part of the or each interface being common with the surface of the at least one transparent microsphere.

Here, the nonlinear optical active region may be in the at least one transparent microsphere, and wherein the at least one transparent microsphere is made of a nonlinear optical active substance system.

The nonlinear optical element may further comprise a solid medium, through which the at least one transparent microsphere is fixed to the substrate.

The solid medium may have arranged therein the at least one transparent microsphere.

The solid medium may be a plurality of the transparent microspheres arranged unidimensionally.

The solid medium may have a plurality of the transparent microspheres arranged two-dimensionally.

The solid medium may have a plurality of the transparent microspheres arranged three-dimensionally.

The nonlinear optical element may have a plurality of the transparent microspheres optically connected through an optical medium one to another.

The nonlinear optical element may be occupied by the solid medium, which may be made of a nonlinear optical substance system, and which may contact at least a part of the surface of the at least one transparent microsphere.

The solid medium may contain the at least one transparent microsphere.

The solid medium may contain a plurality of the transparent microspheres arranged unidimensionally.

The solid medium may contain a plurality of the transparent microspheres arranged two-dimensionally.

The solid medium may contain a plurality of the transparent microspheres arranged three-dimensionally.

The nonlinear optical active region may be a shell-like layer covering the surface of the transparent microsphere concentrically thereto.

According to the second aspect of the present invention, a nonlinear optical system comprises:
(1) an excitation beam source; and
(2) a nonlinear optical element optically connected to the excitation beam source, the nonlinear optical element comprising:
 (a) a substrate;
 (b) at least one transparent microsphere, the or each transparent microsphere having a surface and fixed to the substrate:
 (c) at least one nonlinear optical active region associated with the at least one transparent microsphere; and
 (d) at least one light reflection region associated with the at least one transparent microsphere, the light reflection region having an interface and at least a part of the or each interface being common with the surface of the at least one transparent microsphere.

Here, the nonlinear optical system may further comprise:
(3) a control beam source optically connected to the nonlinear optical element.

According to the third aspect of the present invention, a method of amplifying a light comprises the steps of:
(1) providing an excitation beam source, and a nonlinear optical element optically connected to the excitation beam source, the nonlinear optical element comprising:
 (a) a substrate;
 (b) at least one transparent microsphere, the transparent microsphere having a surface and fixed tor13e substrate;
 (c) at least one nonlinear optical active region associated with the at least one transparent microsphere; and
 (d) at least one light reflection region associated with the at least one transparent microsphere, the light reflection region having an interface and at least a part of the or each interface being common with the surface of the at least one transparent microsphere;
(2) irradiating an excitation beam from the excitation beam source to the nonlinear optical element to introduce the excitation beam into the at least one nonlinear optical active region to emit a beam in the nonlinear optical active region; and
(3) repeatedly reflecting the beam in the or each light reflection region.

Here, the at least one nonlinear optical active region may be outside the at least one transparent microsphere.

The at least one nonlinear optical active region may be common with the at least one light reflection region.

The common region may be inside the at least one transparent microsphere.

The common region may be a shell-like layer provided on the surface of the at least one transparent microsphere concentric thereto.

The method of amplifying light may further comprise the step of:
- (4) irradiating, to the at least one nonlinear optical region, a control beam with a specified wavelength in a wavelength region equivalent to that of the beam, thereby enhancing the light emission intensity of the at least one transparent microsphere.

According to the fourth aspect of the present invention, a method of injection mode locking comprises the steps of:
(1) providing an excitation beam source, and a nonlinear optical element optically connected to the excitation beam source, the nonlinear optical element comprising:
 (a) a substrate;
 (b) at least one transparent microsphere, the or each transparent microsphere having a surface and fixed to the substrate;
 (c) at least one nonlinear optical active region associated with the at least one transparent microsphere; and
 (d) at least one light reflection region associated with the at least one transparent microsphere; the light reflection region having an interface and at least a part of the interface being common with the surface of the at least one transparent microsphere;
(2) irradiating an excitation beam from the excitation beam source to the nonlinear optical element to introduce the excitation beam into the at least one nonlinear optical active region to emit a beam in the nonlinear optical active region;
(3) repeatedly reflecting the beam in the at least one light reflection region to cause a laser emission; and
(4) irradiating, to the at least one nonlinear optical region, a control beam in a monitoring mode with a specified wavelength in a wavelength region equivalent to that of the laser beam, thereby enhancing the laser emission intensity of the at least one transparent microsphere to cause injection mode locking at an order number equivalent to that of the monitoring mode.

According to the fifth aspect of the present invention, a method of optical switching comprises the steps of:
(1) providing an excitation beam source, and a nonlinear optical element optically connected to the excitation beam source, the nonlinear optical element comprising:
 (a) a substrate;
 (b) at least one transparent microsphere, the or each transparent microsphere having a surface and fixed to the substrate;

(c) at least one nonlinear optical active region associated with the at least one transparent microsphere; and (d) at least one light reflection region associated with the at least one transparent microsphere, the light reflection region having an interface and at least a part of the interface being common with the surface of the at least one transparent microsphere;

(2) irradiating an excitation beam from the excitation beam source to the nonlinear optical element to introduce the excitation beam into the at least one nonlinear optical active region to emit a beam in the nonlinear optical active region;

(3) repeatedly reflecting the beam in the at least one light reflection region to cause a laser emission;

(4) irradiating, to the at least one nonlinear optical region, a control beam in a monitoring mode with a specified wavelength in a wavelength region equivalent to that of the laser emission, thereby enhancing the laser emission intensity of the transparent microsphere to cause injection mode locking at a specified monitoring mode with an order number equivalent to that of the monitoring mode; and (5) rendering the control beam on or off.

According to the sixth aspect of the present invention, a method of coupling whispering gallery modes comprises the steps of:

(1) providing an excitation beam source, and a nonlinear optical element optically connected to the excitation beam source, the nonlinear optical element comprising:

(a) a substrate;

(b) a plurality of transparent microspheres each having a surface and fixed to the substrate;

(c) at least one nonlinear optical active region associated with the transparent microspheres; and (d) a plurality of light reflection regions associated with the plurality of transparent microspheres, each of the plurality of light reflection regions having an interface, at least a part of each of the interface being common with the surface of each of the transparent microspheres;

(2) irradiating an excitation beam from the excitation beam source to the nonlinear optical element to introduce the excitation beam into the at least one nonlinear optical active region to produce at least one beam; and (3) repeatedly reflecting the at least one beam in the light reflection regions, respectively.

Here, the method of coupling whispering gallery modes may further comprise the step of:

(4) irradiating, to the at least one nonlinear optical active region, a control beam with a specified wavelength equivalent to that characteristic to one of the plurality of transparent microspheres, thereby controlling the whispering gallery modes.

According to the present invention, one or more transparent microspheres constituting the nonlinear optical element can individually operate as a single discrete microcavity, which makes it possible to utilize a high Q value due to the photoconfinement effect and allow nonlinear optical effects to be exhibited with a very weak light.

Arrangement of a plurality of transparent microspheres to connect them in series and fixation of them to a substrate enable coupling of lights entrapped in the respective transparent microspheres, allowing exhibition of great nonlinear optical effects.

Because the nonlinear optical element is constituted by at least one transparent microsphere and the microsphere is very small, it is possible to apply the nonlinear optical element of the present invention to micro optical systems such as optical fibers directly. This can give rise to nonlinear optical elements which are of high densities and integrated types, and have compact structures.

The nonlinear optical element having transparent microspheres arranged and fixed two-dimensionally on the substrate not only can constitute a phase conjugate mirror utilized in compensating for phase distortion in surface light emission lasers or marking transmittance or in image processing but also can be used as an optical logic element, an optical storage cell, an optical rectifier element, an optical transistor, an optical switch or the like, especially an all optical element.

Nonlinear optical element of the present invention having the transparent microspheres which contain different luminous dyes, and are uniformly arranged on the substrate enables color analysis or image synthesis of phase conjugate image by image formation in the arranged transparent microspheres with a color image signal light and selective irradiation of lights with wavelengths matching those of the absorption peaks of the dyes contained in the respective microspheres.

The nonlinear optical element of the present invention is mechanically stable and easy to be handled since it has a construction that one or more transparent micropheres are fixed to the substrate, and therefore is practically very useful.

The above and other objects, effects, features and advantages of the present invention will become more apparent from the following description of embodiments thereof taken in conjunction with the accompanying drawings.

DESCRIPTION OF PREFERRED EMBODIMENTS

Figure 1:
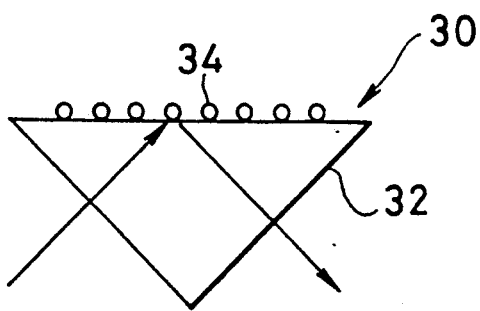
FIG. 1 is a schematic cross sectional view showing a nonlinear optical element according to the first embodiment of the present invention, with illustrating the arrangement and fixation of transparent microspheres to a substrate.

The nonlinear optical element of the present invention has a substrate and a nonlinear optical unit fixed thereto. The nonlinear optical unit includes at least one transparent microsphere, at least one nonlinear optical active region and at least one light reflecting region associated with the transparent microsphere(s). The nonlinear optical active region(s) may be present either in the inside or outside of the transparent microsphere(s), or in both of them. When the nonlinear optical active region is in the inside of the transparent microsphere(s), the transparent microsphere may be made of a nonlinear optical active substance system partially or entirely. Alternatively, the transparent microsphere(s) may be doped with a nonlinear optical active substance partially or entirely. On the other hand, when the nonlinear optical active region is in the outside of the transparent microsphere(s), the nonlinear optical active region may be provided, for example, in the form of a solid medium containing a nonlinear optical active substance system and serving as an adhesive for fixing the transparent microsphere(s) to the substrate. The light reflection region has an interface which may be common with the surface of the transparent microsphere partially or entirely. For example, when the light reflection region is in the inside of the transparent microsphere, the surface of the transparent microsphere serves as the interface of the light reflection region and the light confined in the transparent microsphere propagates within the microsphere and reflects on the interface. In another possibility, when the light reflection region is outside, more particularly around, the transparent microsphere, a light propagates in a cavity defined by the inter face of the light reflection region including the surface of the transparent microsphere and reflects on the interface of the solid medium constituting the light reflection region and also on the surface of the transparent microsphere.

Typically, the nonlinear optical unit used in the nonlinear optical element of the present invention may be composed of one or more transparent microspheres made of a nonlinear optical active substance system. Another typical example of the nonlinear optical unit is a combination of one or more transparent microspheres with a nonlinear optical active solid medium which contacts at least a part of the surface or surfaces of the transparent microsphere(s). In the latter case, the transparent microsphere(s) may be made of either a nonlinear optical active material or substance system, or a material different therefrom.

No matter whether they are made of a nonlinear optical active material or not, the transparent microspheres used in the present invention may have a refractive index of at least 1.4, preferably at least 1.45 so that they can exhibit excellent optical characteristics.

Regardless of whether they are made of a nonlinear optical active substance system or not, the transparent microspheres used must have a transparency high enough to exhibit photoconfinement effect, and it is practically preferred that they have a transparency of $5 \times 10$ cm$^{-1}$ or less. Here, the transparency is defined as $\alpha$ in $I_o \exp(-\alpha L)$, intensity of transmitted light when excitation light having an intensity of incident light $I_o$ passes through a medium having a thickness of L cm.

In order for the nonlinear optical element to exhibit its nonlinear function sufficiently, the solid medium contacting the transparent microsphere or microspheres may have a nonlinear optical coefficient $\chi^{(3)}$ of, preferably $10^{-20}$ esu or larger, and more preferably $10^{-13}$ esu or larger. The nonlinear optical active substance system constituting the nonlinear optical active region may be composed of a single nonlinear optical active substance or material, or a plurality of nonlinear optical active substances or materials. When the transparent microsphere is made exclusively of a polymer or polymers having nonlinear optical characteristics, the polymer or polymers must meet the condition of the third order harmonic nonlinear optical coefficient $\chi^{(3)}$ described above. On the other hand, when the transparent microsphere is made of a blend of a matrix material and a nonlinear optical active substance, it is sufficient to blend the nonlinear optical active substance in amounts such that the microsphere in its entirety can have a third harmonic nonlinear optical coefficient $\chi^{(3)}$ of $10^{-20}$ esu or larger. In case the solid medium contacting the transparent microsphere must have a third harmonic nonlinear optical coefficient $\chi^{(3)}$ of $10^{-20}$ esu or larger, the solid medium may be mixed with a nonlinear optical active substance so that the resulting solid medium can be adjusted in its entirely to have a third-order harmonic nonlinear optical coefficient $\chi^{(3)}$ of $10^{-20}$ esu or larger.

The transparent microspheres which can be used in the present invention may have a diameter of, usually 1 to 200 μm, and preferably 10 to 100 μm. If the diameter of the microsphere is less than 1 μm, it is difficult to confine light into the microsphere so that whispering gallery modes will become difficult to appear to decrease Q value (quality factor) representative of the efficiency of confinement or entrapping of light. On the contrary, if the transparent microsphere has a diameter of above 100 μm, a large number of modes are confined, which makes the optical information complicated.

In a system in which the transparent microsphere contacts the solid medium made of the nonlinear optical active substance or composition, the third-order harmonic nonlinear optical coefficient $\chi^{(3)}$ of the transparent microsphere itself may be set arbitrarily.

In order to allow sufficient photoconfinement effect to occur inside the transparent microsphere, the microsphere may preferably be a regular sphere in shape and have a smooth surface such that there are on the surface no depressions or protrusions or cracks, flaws or any other types of irregularities of a depth or height by 1/10 time or more, preferably 1/20 time or more, as large as the wavelength of the irradiated light.

In case the nonlinear optical element of the present invention is to be a fabricated using a plurality of transparent microspheres having a uniform particle diameter, coefficient of variation of particle diameter of the transparent microspheres is preferably 5% or less. If the coefficient of variation of particle diameter is within that range, light confinement modes in the respective microspheres are rendered uniform, and the microspheres can be used under equivalent conditions.

Here, the coefficient of variation of particle diameter is expressed by the following formula:

$$\text{coefficient of variation} = \frac{\text{standard deviation}}{\text{mean particle diameter}} \times 100 \ (\%)$$

The particle diameter of each particle is measured under microscope.

The solid medium may be provided on the surface of the transparent microsphere to form a concentric shell.

The transparent microsphere or solid medium constituting the nonlinear optical active part or region may be made of, for example, (1) an organic polymer, (2) an inorganic substance, or (3) a composite substance composed of an inorganic substance and an organic polymer.

Examples of the organic polymer or the one constituting the composite substance include homopolymers and copolymers of styrene, methacrylates (such as methyl methacrylate), acrylates (such as methyl acrylate), vinyl acetate, divinylbenzene, vinyl monomers having an alicyclic group (such as a cyclohexyl group), and conjugated polymers such as polydiacetylenes, polythiophenes, poly-p-phenylenevinylenes, etc. The conjugated polymers can be used advantageously when the nonlinear optical part is to be constituted with only organic polymer (s).

The transparent microspheres made of the organic polymer may be bilayered ones of which the core particle is made of a first organic polymer and the surface thereof is covered with a second organic polymer different from the first one. In this case, the nonlinear optical active substance may be contained in either one of or both of the core particle and the surface layer (outer shell).

The transparent microsphere made of the organic polymer can be prepared by conventional emulsion polymerization. Also, they can be prepared by seed polymerization of the microspheres thus obtained in which a monomer is polymerized on the transparent microspheres while they are being swollen in a solvent in the presence of a swelling aid or the like.

As the inorganic substance, inorganic optical materials made of metal oxides such as various glasses, alumina, silica, etc. can be used. In case the nonlinear optical active part made of the inorganic substance is used as a light source for lasing with a wavelength of 1,000 nm or more, there can be used preferably glasses containing, as the nonlinear optical active substance, rare earth element ions such as $Nd^{3+}$(neodymium ion), $Eu^{3+}$(europium ion), $Er^{3+}$(erbium ion), or the like, and glasses containing mixed ions composed of the aforementioned rare earth element ions plus metal ions such as $Cr^{3+}$(chromium ion).

The inorganic substance made of a glass containing rare earth element ions includes, for example, glasses such as silicate glass ($SiO_2$), phosphate glass ($P_2O_5$), or fluorophosphate glass ($LiFAl\,(PO_3)_3$), in which generally 10% by weight or less, usually about 3% by weight, of oxide of the aforementioned rare earth element is contained. The glasses can be made spherical by a blowing method including melting the raw composition at about 1,500° C., generally at 800° to 900° C. with adding a melting aid, to prepare glass cullet, shattering the cullet, classifying the resulting glass fragments, and melting the glass fragments again in flame to obtain transparent microspheres made of glass.

The transparent microspheres made of a composite substance may be those of which the composite substance is composed of the inorganic substance and the organic polymer. For example, the transparent microspheres may comprise core particles which have a regular sphere and are made of an inorganic substance or an organic polymer, and an outer layer or shell formed on the surfaces of the core particles, the layer or shell being made of an organic polymer or an inorganic substance, respectively. More particularly, the surfaces of glass beads can be treated with a silane coupling agent having a vinyl group, and the aforementioned vinyl monomer is polymerized in the presence of a radical initiator such as benzoyl peroxide on the surfaces of the treated glass beads to obtain composite transparent microspheres. The composite transparent microsphere which can be used in the present invention also includes transparent microspheres made of polysiloxane, polysilanes, or the like having one or more organic substituent groups prepared by a conventional sol-gel method, and any transparent microspheres whose surfaces are treated with the aforementioned sol-gel method.

The nonlinear optical active substances in the nonlinear optical active substance system used in the present invention can be selected from those which can be excited with laser beam used as incident light. When the nonlinear optical active part is made of a nonlinear optical active substance and a matrix material, it is preferred to use the nonlinear optical active substances having compatibilities with the matrix material.

When the nonlinear optical element is intended to be used for lasing, the nonlinear optical active substance system may be selected from those substances which can emit strong fluorescent light, for example, organic fluorescent dyes such as Rhodamine 6 G, nile red, and coumarin, the aforementioned rare earth element ions, lasing materials composed of semiconductors of the families III-V type, e.g., GaAs, and the like. When the nonlinear optical element is directed for uses other than lasing, there can be used, in addition to the aforementioned lasing materials, third nonlinear optical materials including organic conjugate type compounds having low molecular weights such as stilbene, and methylnitroaniline, the aforementioned conjugate polymers, compound semiconductors of the families II-VI type, e.g., CdS, $CdS_xSe_{1-x}$, CuCl, ZnSe, etc. as well as organometallic complexes, complex salts, organic dyes, organic pigments, and the like.

In particular, in cases where attention is focused on third order harmonic nonlinear optical phenomena, it is important that the nonlinear optical active substance system has a transparency and a nonlinear optical susceptibility high enough in a wavelength region of the laser beam used. For example, in the wavelength region of 400 to 900 nm, it is preferred to select the nonlinear optical active substances from the organic polymers or conjugate polymers, blended with organic dyes, the aforementioned organic conjugate compounds having low molecular weights, the aforementioned II-VI type compound semiconductors, and the like. In the wavelength region of 900 nm or more, inorganic compounds such as glasses containing rare earth element ions are preferred.

Furthermore, when the nonlinear optical element of the present invention is intended to be used as a laser, first a desired lasing wavelength region is set up and then a suitable nonlinear optical active substance system is selected taking into consideration what excitation beam is to be used. For example, in the lasing region of 400 to 900 nm, substances having a high fluorescing intensity such as laser dyes, anthracene, etc., are used preferably. In particular, for lasing in the region of 1062 nm band, it is preferred to use transparent microspheres made of a silicate glass containing $Nd^{3+}$ while for lasing in the 1054 nm band, transparent microspheres made of a phosphate glass containing $Nd^{3+}$ are preferred.

The transparent microspheres described above can individually function as a nonlinear optical element and exhibit third harmonic nonlinear optical phenomena, and hence the nonlinear optical element of the present invention may comprise a single transparent microsphere fixed to a substrate.

Alternatively, two or more transparent microspheres may be arranged on a substrate unidimensionally, two-dimensionally or three-dimensionally and fixed thereto, thus providing a nonlinear optical element suitable for various applications.

As described above, the nonlinear optical element of the present invention comprises a nonlinear optical unit fixed to a substrate. As the fixing means for fixing or immobilizing, a solid medium may be used. The solid medium has a refractive index which is lower than that of the transparent microsphere, and difference in the refractive index between the solid medium and the transparent microsphere is 0.05 or more, and preferably 0.1 or more. If the difference in the refractive index between the two is less than 0.05, the coefficient of light confinement into the microsphere decreases, thus failing to give rise to practically acceptable nonlinear optical characteristics sufficient for nonlinear optical elements.

When the transparent microsphere is covered with the solid medium made of the nonlinear optical active substance system, the solid medium may have a refractive index by at least 0.05, preferably by at least 0.1 higher than that of the transparent microsphere. In this case, the solid medium is coated as the outermost layer on the surface of the microsphere to thereby constitute a part of the composite transparent microsphere.

Any material that has a refractive index by at least 0.05 lower than that of the transparent microsphere or transparent core particle and can fix the transparent microsphere to the substrate may be used as the solid medium in the present invention. More specifically, the solid medium is selected from adhesives, organic polymers, inorganic compounds, and the like. For example, there can be used fluorine-containing photohardenable materials, urethane acrylate, gelatin cured with glutaraldehyde, polymethyl methacrylate, water glass, glass-like product obtained by a sol-gel method. The solid medium may also be a gel such as hydrous gel so far as it is non-fluid or immobile. Furthermore, in the present invention, the solid medium itself can constitute the substrate.

The solid medium may contact or cover either the entire surface of the transparent microsphere or a part thereof when the transparent microsphere is fixed therewith to the substrate or immobilized therewith. In both cases, it is necessary that a light path is secured through which the excitation beam is passed to the surface of the or each transparent microsphere and also an output light path is secured through which nonlinear optical phenomena exhibited are monitored or transmitted to the outside of the transparent microsphere(s).

Alternatively, the transparent microsphere may be fixed or immobilized mechanically by clamping the transparent microsphere(s) with two substrates.

When fixing the transparent microsphere(s), an individual transparent microsphere may be caught and arranged on the substrate with a diamond stylus, a manipulator or the like, or a single transparent microsphere or a population of transparent microspheres may be moved and arranged appropirately on the substrate by means of pressure of a laser beam. A thin film of the transparent microsphere formed on a gas-liquid interface or a liquid-liquid interface may be transferred onto the substrate.

The substrate may be patterned using a resist material before fixing the transparent microsphere thereto. Provision of the patterns makes it possible to fix the transparent microsphere or microspheres at predetermined position(s) easily and with certainty. The substrate may be formed with a groove or micro depressions for receiving the transparent microspheres in order to facilitating to securely hold the transparent microsphere(s).

A plurality of the transparent microspheres may be arranged unidimensionally, two-dimensionally or three-dimensionally, in a non-connected (non-contacting) state to each other, or in a state in which some part or a required number of transparent microspheres are connected (contacting) to each other directly or indirectly via an optical medium such as an optical fiber, followed by fixing to obtain nonlinear optical elements having various functions corresponding to various purposes.

To emit an excitation beam or light to be used for controlling the nonlinear optical characteristics of the nonlinear optical elements of the present invention, that is, for allowing nonlinear optical effects to be selectively exhibited, there can be used various laser beam sources. Generally, continuous wave lasers (CW lasers) such as gas lasers, solid lasers, dye lasers, and semiconductor lasers, and pulse lasers can be used. Laser beams from such lasers have a wavelength within the range of, usually 0.2 to 2 $\mu$m, and preferably 0.4 to 1.2 $\mu$m. The excitation beam, which may be monochromatic or mixtures of two or more rays having different wavelengths, can be selected appropriately depending on the type of the transparent microsphere constituting the nonlinear optical element of the present invention, and the nonlinear optical effects to be obtained.

While the power of the excitation beam must be high enough to cause a laser emission when a conventional nonlinear optical element is used for lasing, only a weak excitation beam as high as 100 pJ or less, for example, can cause nonlinear optical phenomena sufficiently.

Figure 2:
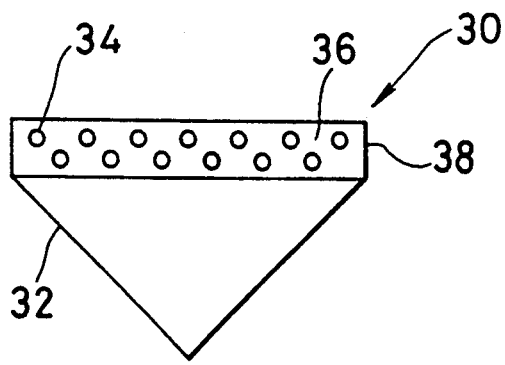
FIG. 2 is a schematic cross sectional view showing a nonlinear optical element according to the second embodiment of the present invention, with illustrating the arrangement and fixation of transparent microspheres to a substrate.
Figure 3:
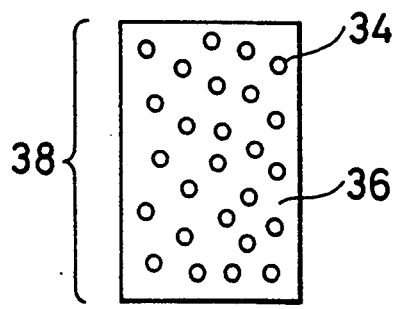
FIG. 3 is a schematic cross sectional view showing a nonlinear optical element according to the third embodiment of the present invention, with illustrating the arrangement and fixation of transparent microspheres to a substrate.
Figure 4:
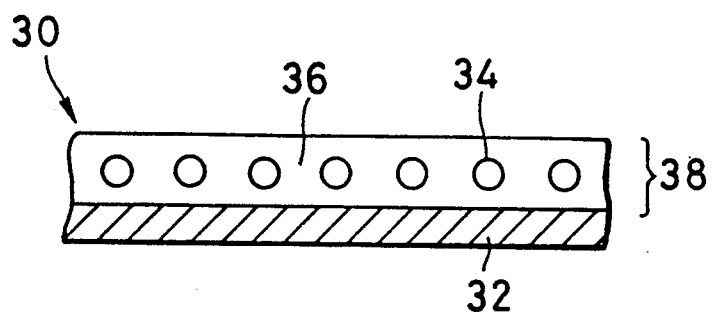
FIG. 4 is a schematic cross sectional view showing a nonlinear optical element according to the fourth embodiment of the present invention, with illustrating the arrangement and fixation of transparent microspheres to a substrate.
Figure 5:
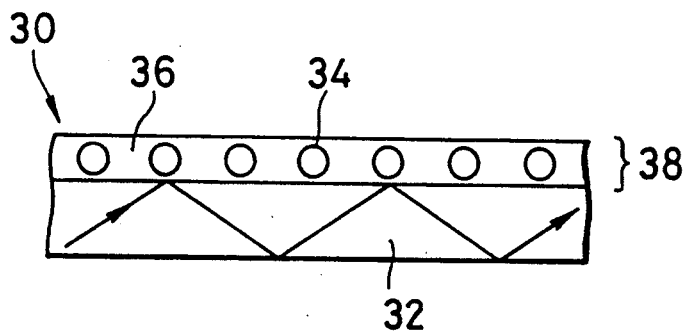
FIG. 5 is a cross sectional view showing a nonlinear optical element according to the fifth embodiment of the present invention, with illustrating the arrangement and fixation of transparent microspheres to a substrate as well as propagation of light in the substrate.
Figure 6:
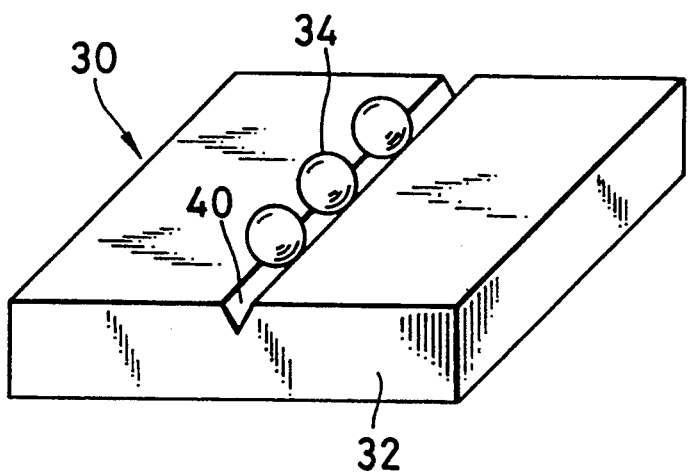
FIG. 6 is a schematic perspective view showing a nonlinear optical element according to the sixth embodiment of the present invention, with illustrating the arrangement and fixation of transparent microspheres to a substrate.
Figure 7:
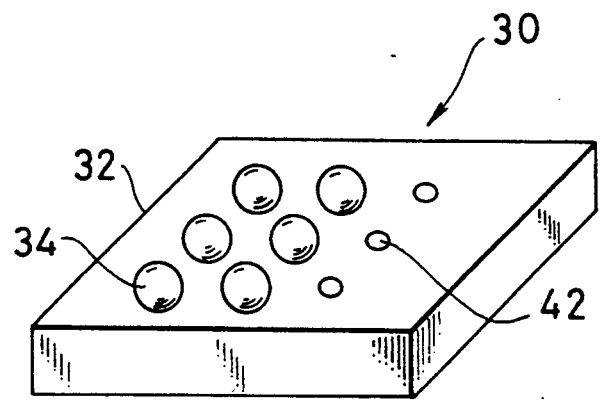
FIG. 7 is a schematic perspective view showing a nonlinear optical element according to the seventh embodiment of the present invention, with illustrating the arrangement and fixation of transparent microspheres to a substrate.

FIGS. 1 to 7 illustrate specific modes of fixation of the transparent microspheres; FIG. 1 is a cross sectional view showing a nonlinear optical element according to one embodiment of the present invention, illustrating propagation of light therein; FIG. 2 is a cross sectional view showing a nonlinear optical element according to another embodiment of the present invention; FIG. 3 is a cross sectional view showing a nonlinear optical element according to still another embodiment of the present invention; FIG. 4 is a cross sectional of view showing a nonlinear optical element according to yet another embodiment of the present invention; FIG. 5 is a cross sectional view showing a nonlinear optical element according to other embodiment of the present invention; FIG. 6 is a schematic perspective view showing a nonlinear optical element according to further embodiment of the present invention; and FIG. 7 is a schematic perspective view showing a nonlinear optical element according to still further embodiment of the present invention.

As shown in FIG. 1, a nonlinear optical element 30 has a substrate 32 in the form of a triangular prism of glass, on which a plurality of transparent microsphere 34 are arranged and fixed or immobilized thereon with a solid medium (not shown) made of an adhesive. In the arrangement shown in FIG. 1, the transparent microspheres are arranged spaced apart from each other. In FIG. 2, the nonlinear optical element 30 has the substrate 32 and a plurality of the transparent microspheres 34 dispersed in a solid medium 36 three-dimensionally. The transparent microspheres 34 and the solid medium 36 together form a solid layer 38, which is fixed to the substrate 32. In FIG. 3, the nonlinear optical element 30 is constituted solely by the solid layer 38 which has the transparent microspheres 34 dispersed in the solid medium 36 three-dimensionally. In this arrangement, the solid layer also serves as the substrate 30. According to the arrangement shown in FIG. 4, the nonlinear optical element 30 has the substrate 32 made of glass and the solid layer 38 fixed to the substrate 32 and composed of the transparent microspheres 32 dispersed unidimensionally in the solid medium 36. In FIG. 5, the nonlinear optical element 30 has the substrate 32 made of glass, onto which the solid layer 38 is fixed. The solid layer 38 includes the solid medium 36 having unidimensionally dispersed therein transparent microspheres 34. The excitation beam propagates in the substrate 32 while repeating reflections as indicated by arrows. The transparent microspheres are arranged in the solid layer 38 such that they are spaced apart from the interface between the substrate 32 and the solid medium 38 at a distance on the order of $\frac{1}{2}$ to 2 times the wavelength of the excitation beam used. According to the arrangement shown in FIG. 6, the nonlinear optical element 30 has the substrate 32 which is formed with a groove 40 of a V form in cross section on upper surface thereof. The transparent microspheres 32 are fitted in the groove 40 and fixed therein with a solid medium or adhesive (not shown). The transparent microspheres 32 are arranged at a predetermined distance one from another, generally $\frac{1}{2}$ to 2 times as long as the wavelength of the excitation beam used, e.g., 0.3 to 0.5 $\mu$m. In FIG. 7, the nonlinear optical element 30 has the substrate 32 formed on its upper surface with a plurality of micro depressions 42, e.g, those with spherical surfaces having a curvature preferably the same as that of the spherical surface of the transparent microsphere to be fixed. The transparent microspheres 32 are placed in the respective depressions and fixed with a solid medium (not shown).

The shape of the substrate 32 is not limited to triangular prism or the like. The transparent microspheres may also be connected and fixed directly to optical media such as optical fibers.

In case a plurality of the transparent microspheres are immobilized, they may be arranged in contact with each other, spaced apart one from another at a distance or pitch $\frac{1}{2}$ to 2 times the wavelength of the excitation beam used, or spaced apart one from another at a distance or pitch more than 2 times the wavelength of the excitation beam used. One of these arrangements is selected depending on the purpose for which the nonlinear optical element is used.

The nonlinear optical element of the present invention exhibit third nonlinear optical effects and hence can be used for various applications. More particularly, the element of the invention can be used in the following:

(1) Frequency triplers as ones utilizing third harmonic wave oscillation ($\omega+\omega+\omega \rightarrow 3\omega$);
(2) Ultrahigh speed shutters as ones utilizing Kerr effect ($\omega+0+0 \rightarrow \omega$);
(3) Optical memories, optical arithmethical elements, etc. as ones utilizing optical bistability ($\omega+\omega-\omega \rightarrow \omega$); and
(4) Rhaman spectroscopes as ones utilizing optical mixing ($\omega1+\omega2+\omega3 \rightarrow \omega4$).

EXAMPLES

Hereafter, the present invention will be described in greater detail by examples. However, the present invention should not be construed as being limited thereto.

EXAMPLE 1

A transparent microsphere of polystyrene having a particle diameter of 40 μm was stained by a conventional emulsion staining method using Nile Red (diethylamino-9-naphthophenoxazone, a red dye produced by Aldrich) and a surfactant to obtain a transparent microsphere of Nile Red-containing polystyrene having a regular spherical shape and a smooth surface, the microsphere containing Nile Red as the nonlinear optical active substance (refractive index=1.6, transparency=20 cm$^{-1}$ or more, third nonlinear optical coefficient $\chi^3 = 10^{-20}$ esu or more). The microsphere was fixed onto a surface of a quarts glass substrate with an adhesive (solid medium: gelatin hardened with glutaraldehyde, refractive index: 1.5) to obtain a nonlinear optical element of the present invention.

Figure 9:
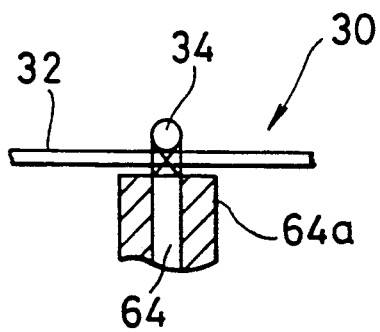
FIG. 9 is a partial cross sectional view showing the nonlinear optical element and the optical fiber optically connected thereto shown in FIG. 8.
Figure 8:
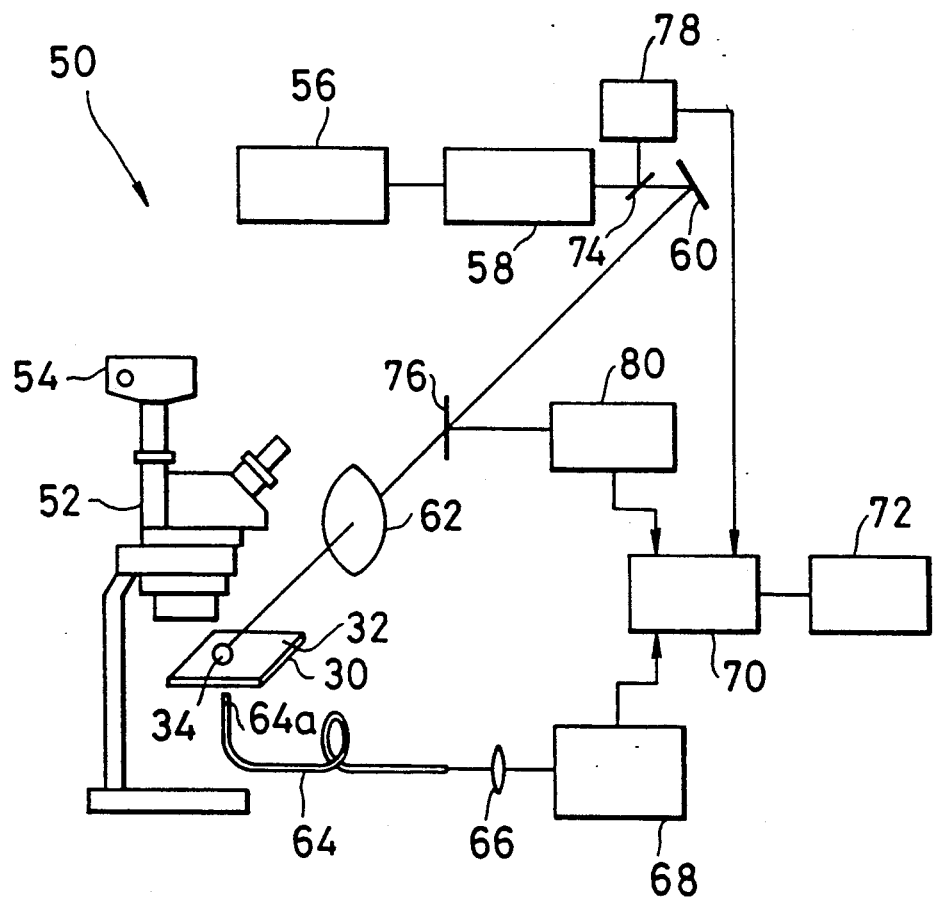
FIG. 8 is a block diagram showing an apparatus for measuring the nonlinear optical characteristics of a nonlinear optical element according to one embodiment of the present invention.

FIG. 8 is a block diagram showing an apparatus for measuring nonlinear optical characteristics; and FIG. 9 is a partial cross sectional view showing the nonlinear optical element and an optical fiber optically connected thereto. The nonlinear optical element thus obtained was measured for its nonlinear optical characteristics using the apparatus shown in FIG. 8. As shown in FIG. 8, an apparatus 50 for measuring the nonlinear optical characteristics of the nonlinear optical element 30 comprises a stereoscopic microscope 52 equipped with a camera 54. The nonlinear optical element 30 above is placed so that it is in the field of view of the microscope 52. The apparatus 50 includes a light source or excimer laser 56 optically connected to a dye laser 58 which produces a laser beam for excitation. The excitation beam is reflected at a mirror 60 and passed through a lens 62 and introduced into the transparent microsphere 34 fixed on the glass substrate 32. An emergent beam from the nonlinear optical element 30 is received by an optical fiber 64, passed through a lens 66 and led to a spectroscope 68, which is connected to a Box-Kerr integrator 70. The integrator 70 is connected to a computer 72. On the other hand, the excitation beam is split through beam splitters 74 and 76, respectively, and through pin photodiodes 78 and 80, respectively, each of which is connected to the Box-Kerr integrator 70.

As shown in FIG. 9, the transparent microsphere 34 is fixed onto the substrate 32 with an adhesive or solid medium (not shown), and a tip 64a of the optical fiber 64 is arranged under the lower surface of the substrate 32 so that the tip 64a opposes the transparent microsphere.

Figure 10:
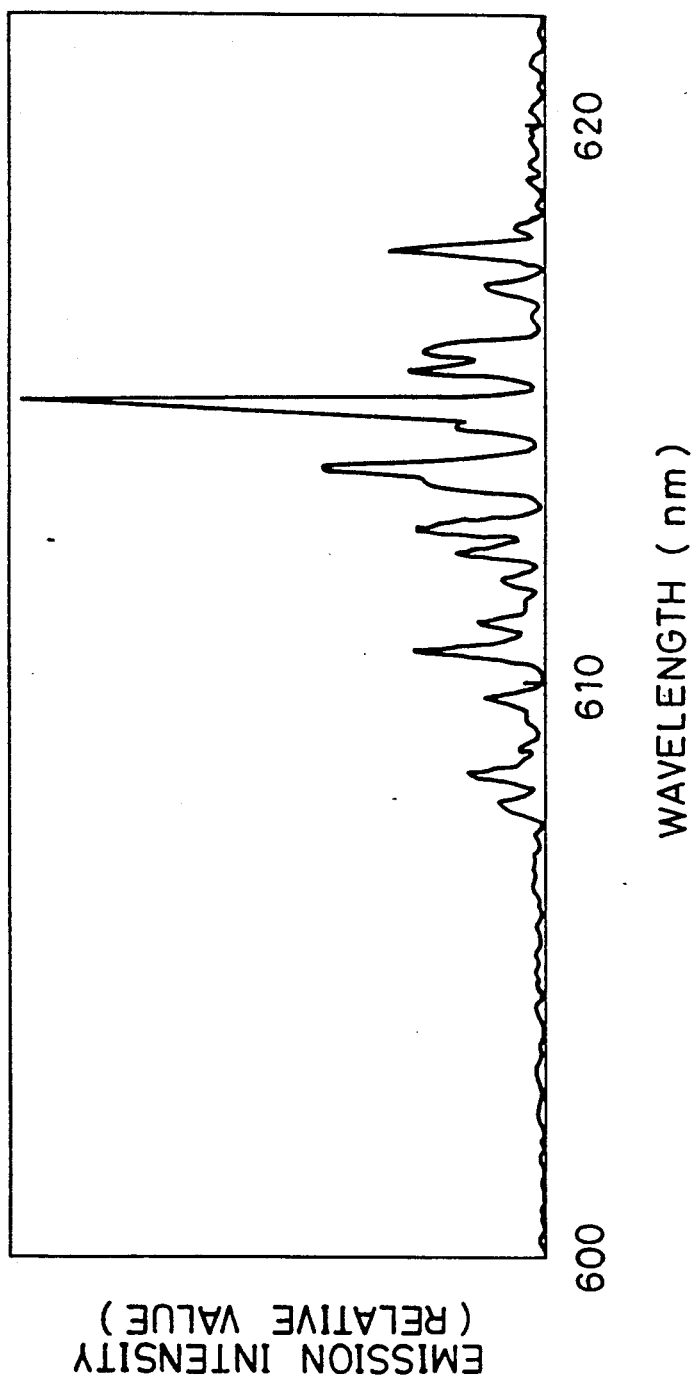
FIG. 10 is a graph illustrating a light emission spectrum of a nonlinear optical element of Example 1, with sharp peaks in the region of 600 to 620 nm being representative of modes characteristic to a transparent microsphere containing Nile Red which constitutes the nonlinear optical element.

FIG. 10 is a graph illustrating results of measurement of light emission spectrum of the nonlinear optical element 30 of this example upon irradiation with a pulsed laser beam with a wavelength of 530 nm (power=100 W) using the apparatus 50, with sharp peaks in the region of 600 to 620 nm being lasing modes characteristic to the transparent microsphere containing Nile Red which constitute the element. Such sharp peaks were not observed with homogeneous solution of Nile Red. The modes (hereafter, referred to as "whispering gallery modes") are typical patterns evidencing photoconfinement effect at certain wavelengths in the nonlinear optical element of this example.

Next, various transparent polystyrene microspheres with different particle diameters, i.e., 1, 5, 10, 20, 30, 40, 60, and 90 μm, respectively, were prepared in the same manner as above and were used. The transparent microspheres were fixed to respective substrates to obtain four nonlinear optical elements.

Figure 11:
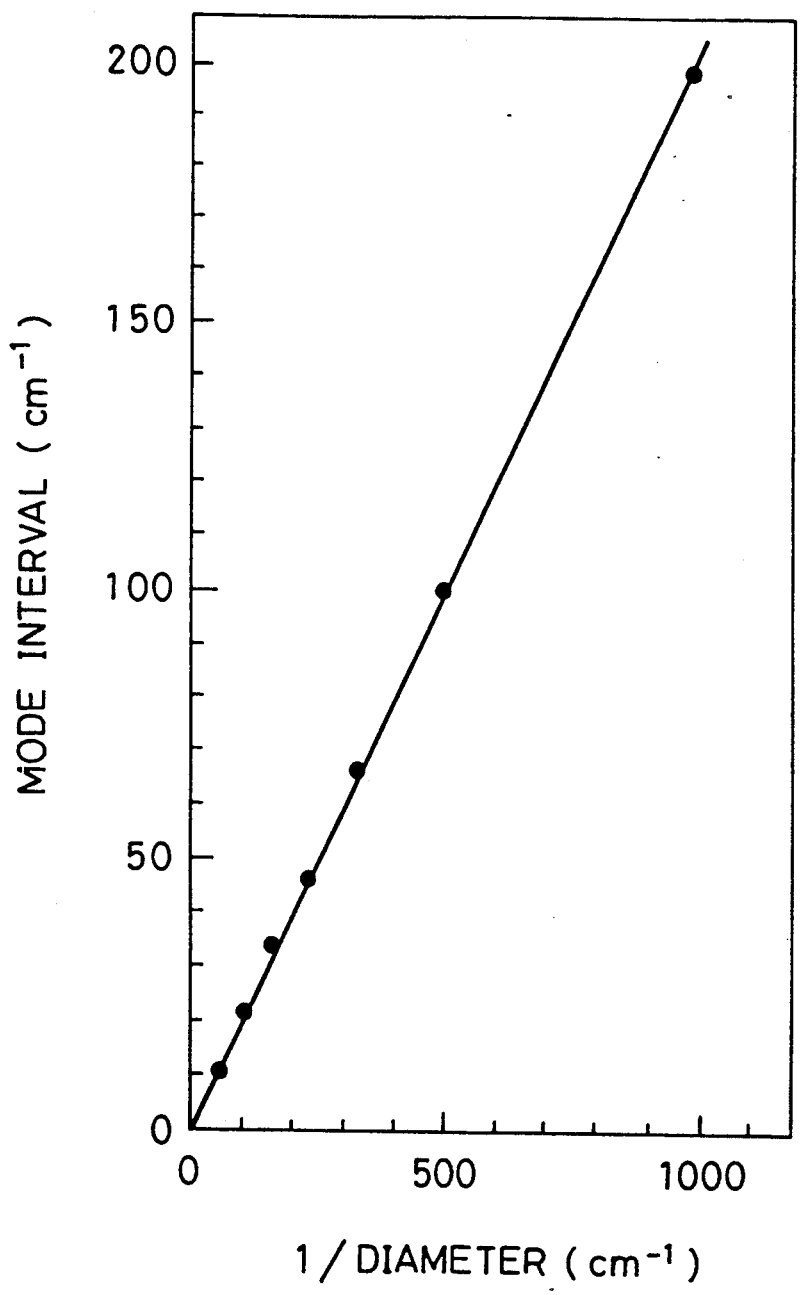
FIG. 11 is a graph illustrating relationship between the particle diameter of a transparent microsphere constituting a nonlinear optical element of Example 1 and the mode interval in lasing with the nonlinear optical element.

The resulting nonlinear optical elements were respectively irradiated with pulsed laser beam with a wavelength of 530 nm (power=100 W), and measurement was made of mode intervals. Results obtained are plotted against reciprocal of the particle diameter of each transparent microsphere in FIG. 11. From FIG. 11, it can be seen that the nonlinear optical element of the present invention is a good cavity for achieving light confinement, and the regularity of mode interval depends on the particle diameter of the transparent microsphere which constitutes the nonlinear optical element of the present invention.

EXAMPLE 2

A regular spherical, transparent microsphere made of polystyrene containing Nile Red and having a particle diameter of 40 μm was prepared in the same manner as in Example 1 and fixed onto a substrate made of glass in the same manner as in Example 1 to obtain a nonlinear optical element of the present invention.

Figure 12:
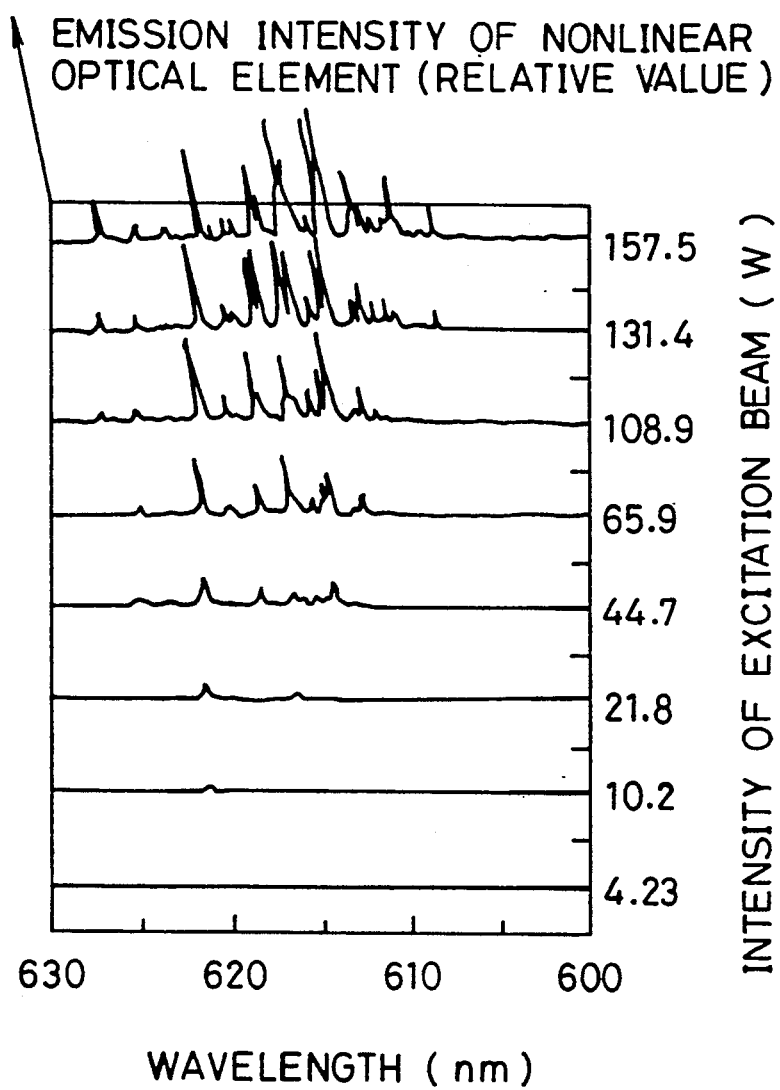
FIG. 12 is a graph illustrating dependence of the light emission intensity of a nonlinear optical element of Example 2 on the intensity of an excitation beam.
Figure 13:
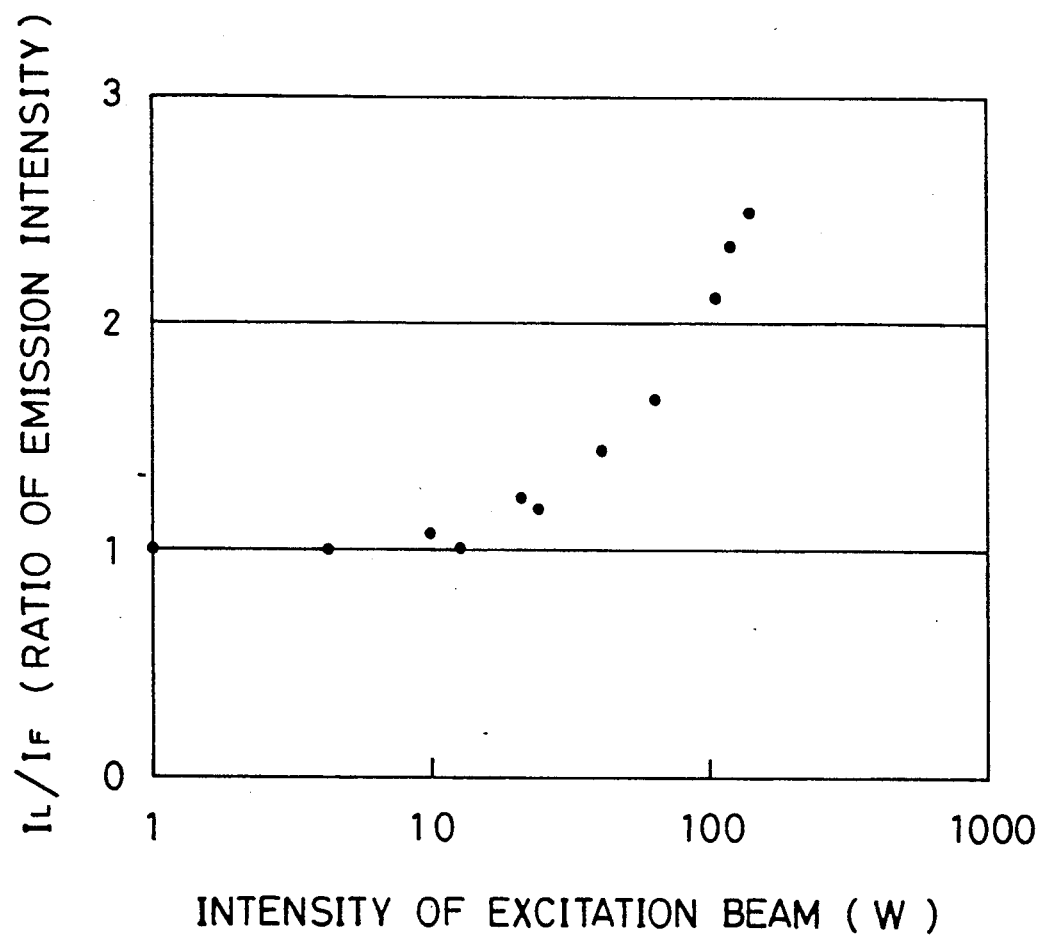
FIG. 13 is a graph illustrating dependence of the ratio of light emission intensity in a lasing wavelength region to that in a spontaneous fluorescing wavelength region of a nonlinear optical element of Example 2 on the intensity of an excitation beam.
Figure 14:
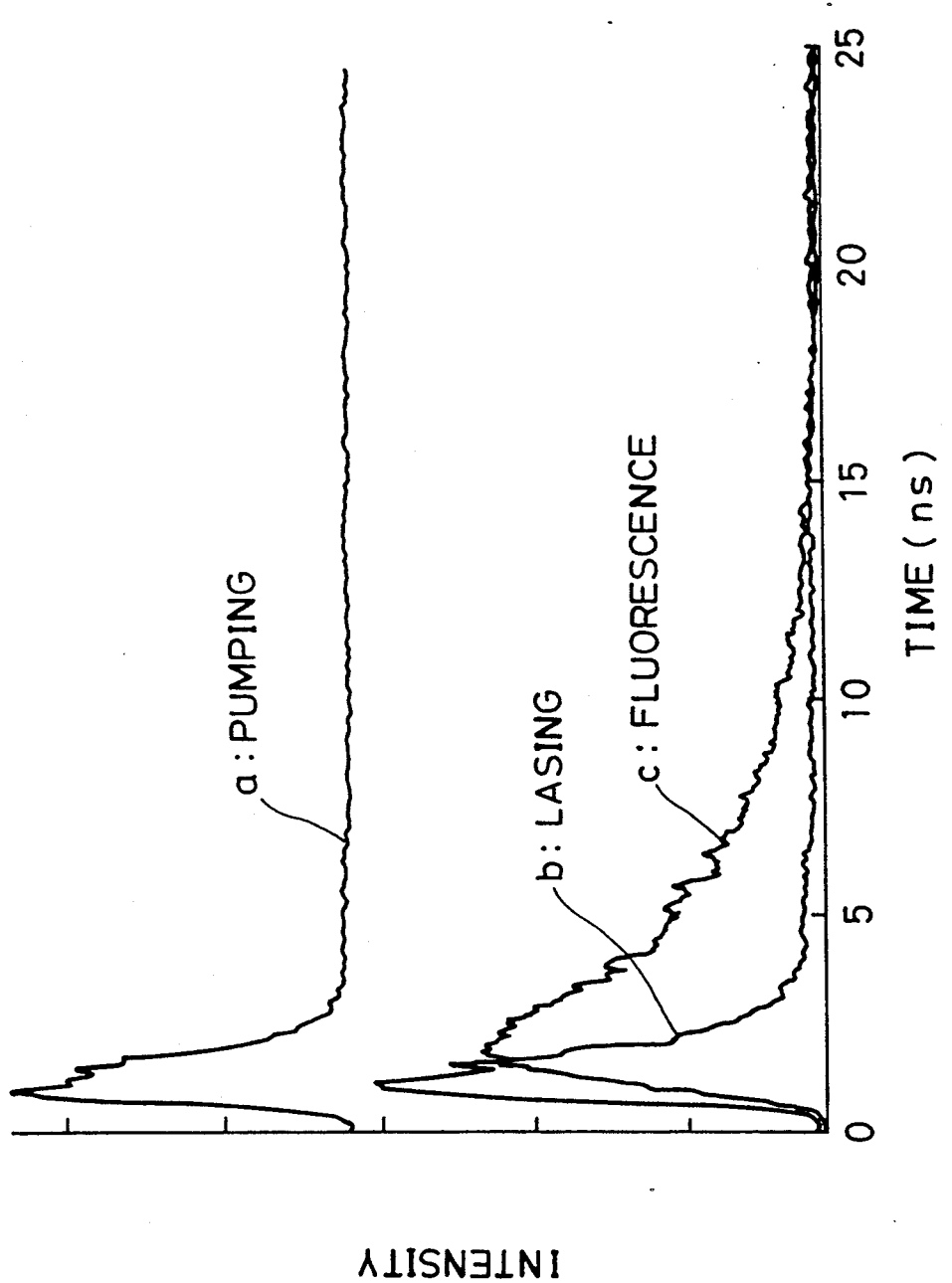
FIG. 14 is a graph illustrating time response characteristics of light emission by a nonlinear optical element of Example 2.

Measurement of the emission intensity of the nonlinear optical element was made, with varying the intensity of the excitation beam, and results obtained are illustrated in FIGS. 12, 13 and 14. FIG. 12 illustrates dependence of the light emission intensity of the nonlinear optical element on the intensity of excitation beam; FIG. 13 illustrates dependence of the ratio of the light emission intensity in the lasing wavelength region to that in spontaneous fluorescing wavelength region of the nonlinear optical element on the intensity of the excitation beam; and FIG. 14 illustrates time response characteristics of light emission by the nonlinear optical element.

From FIG. 12, it can be seen that sharp light emission peaks appear in a wavelength region of 600 to 630 nm according as the intensity of the excitation beam increases. The light emission peaks are considered to correspond to lasing of whispering gallery modes judging from the dependence on the intensity of the excitation beam illustrated in FIG. 13 and the time response characteristics illustrated in FIG. 14. In FIG. 13, $I_L$ designates the intensity of light emission in lasing wavelength region and $I_F$ the intensity of emission light in spontaneous emission or spontaneous fluorescing wavelength region.

In FIG. 14, curves c and b indicate time response characteristics of light emissions at excitation beam intensities of below the threshold and of above the threshold, respectively. Curve c shows a typical profile for spontaneous emission while curve b is characterized by an abrupt rising following the pumping beam a and a short relaxation time from which it is concluded that the curve b shows a profile of lasing.

As described above, the nonlinear optical element of the present invention can function as a laser beam source even when it has only one transparent microsphere fixed to the substrate. Therefore, by arranging the transparent microsphere two- or three-dimensionally and fixing them, the nonlinear optical element of the present invention can be used as two- or three-dimensional arrays for plane emission lasers and optical computers.

EXAMPLE 3

Figure 15:
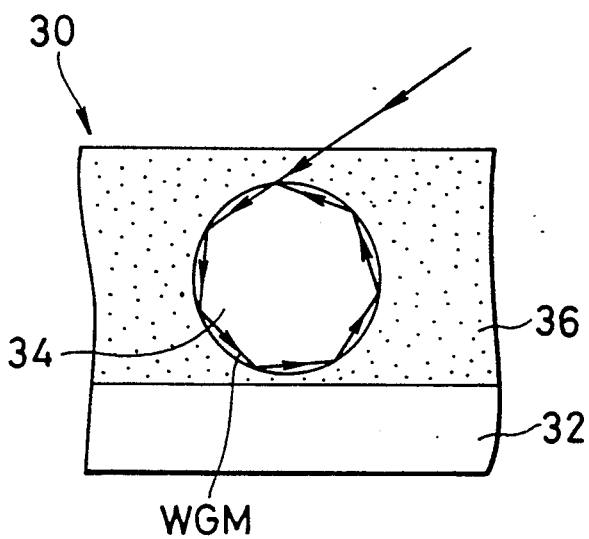
FIG. 15 is a schematic cross sectional view showing a nonlinear optical element of Example 3, with illustrating its function.
Figures 16A, 16B:
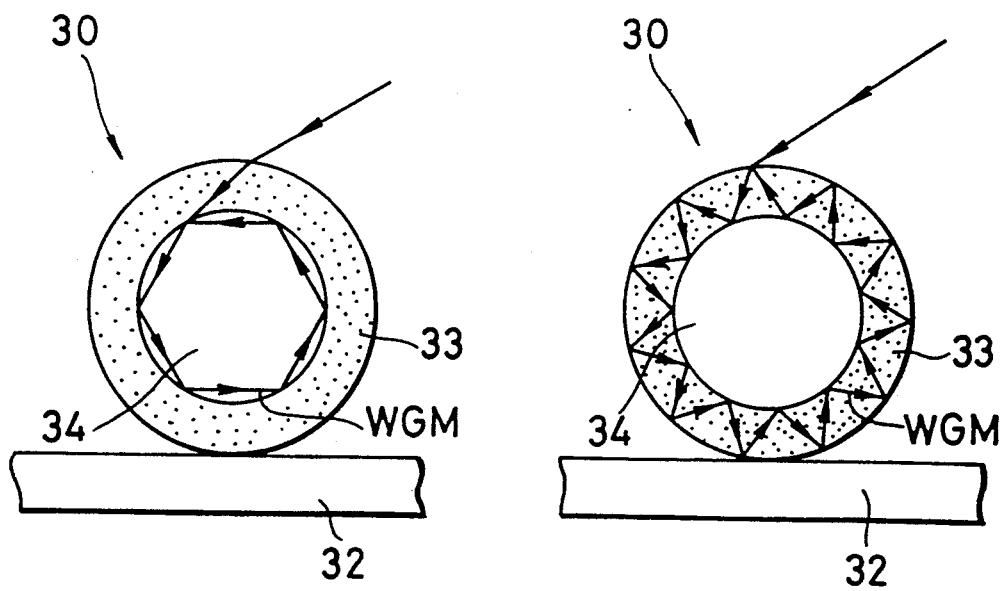
FIG. 16A is a schematic cross sectional view showing a nonlinear optical element of Example 3, with illustrating its function.
FIG. 16B is a schematic cross sectional view showing a nonlinear optical element of Example 3, with illustrating its function.

As examples of nonlinear optical elements in which the transparent microsphere is fixed to the substrate through the solid medium made of a nonlinear optical active substance system, those as illustrated in FIGS. 15, 16A and 16B were prepared. FIGS. 15, 16A and 16B are each a cross sectional view of the nonlinear optical element. In FIG. 15, the nonlinear optical element 30 comprises the substrate 32 on which the solid layer 38 made of a nonlinear optical active substance system is fixed. The solid layer has embedded therein the transparent microsphere 34. This nonlinear optical element 30 was fabricated by fixing the transparent microsphere 34 having a particle diameter of 40 μm onto the substrate 32 made of quartz glass with polymethyl methacrylate 36 containing Nile Red as an adhesive, which serves as the nonlinear optical active part or region. Upon irradiation of an excitation beam, fluorescent light was emitted by Nile Red contained in the polymethyl methacrylate. This was introduced into the polystyrene microsphere having a refractive index greater than that of the polymethyl methacrylate, and sharp light emission peaks in the wavelength region of 600 to 630 nm were observed. This confirmed that whispering gallery mode (WGM) was established within the cavity of the microsphere.

On the other hand, in the arrangement shown in FIG. 16A, a transparent microsphere 34 made of glass (refractive index: 1.9) and having a particle diameter of 40 μm was coated with polymethyl methacrylate 33 containing Nile Red to obtain the nonlinear optical element 30 fixed on quartz glass substrate 32 of the present invention. Also, the nonlinear optical element 30 of the invention as shown in FIG. 16B was fabricated by coating the transparent microsphere 34 made of glass (refractive index: 1.5) and having a particle diameter of 40 μm with polystyrene 33 containing Nile Red, being fixed on the quartz glass substrate 32. Upon irradiation of an excitation beam, fluorescent light was emitted from Nile Red contained in the polymethyl methacrylate or polystyrene, and the emitted light was introduced into the transparent microsphere and confined therein in FIG. 16A or propagates in the layer (solid medium or nonlinear optical active part) 33 in FIG. 16B. Difference in the region where whispering gallery mode was established depends on difference in refractive index between the transparent microsphere and the solid medium contacting the transparent microsphere.

EXAMPLE 4

A nonlinear optical element of the present invention having the same construction as that of Example 1 was fabricated in the same manner as in Example 1.

To the transparent microsphere constituting the nonlinear optical element was irradiated an excitation beam with a wavelength of 530 nm to establish laser emission modes in a wavelength region of 600 to 630 nm, and then a control beam (second excitation beam) with a wave number (wavelength) equal to that of a specified lasing region was irradiated additionally. As a result, it was confirmed that the intensity of laser emission at the specified wave number (monitoring wave number) was reduced or not depending on the wave number of control beam.

Figure 17:
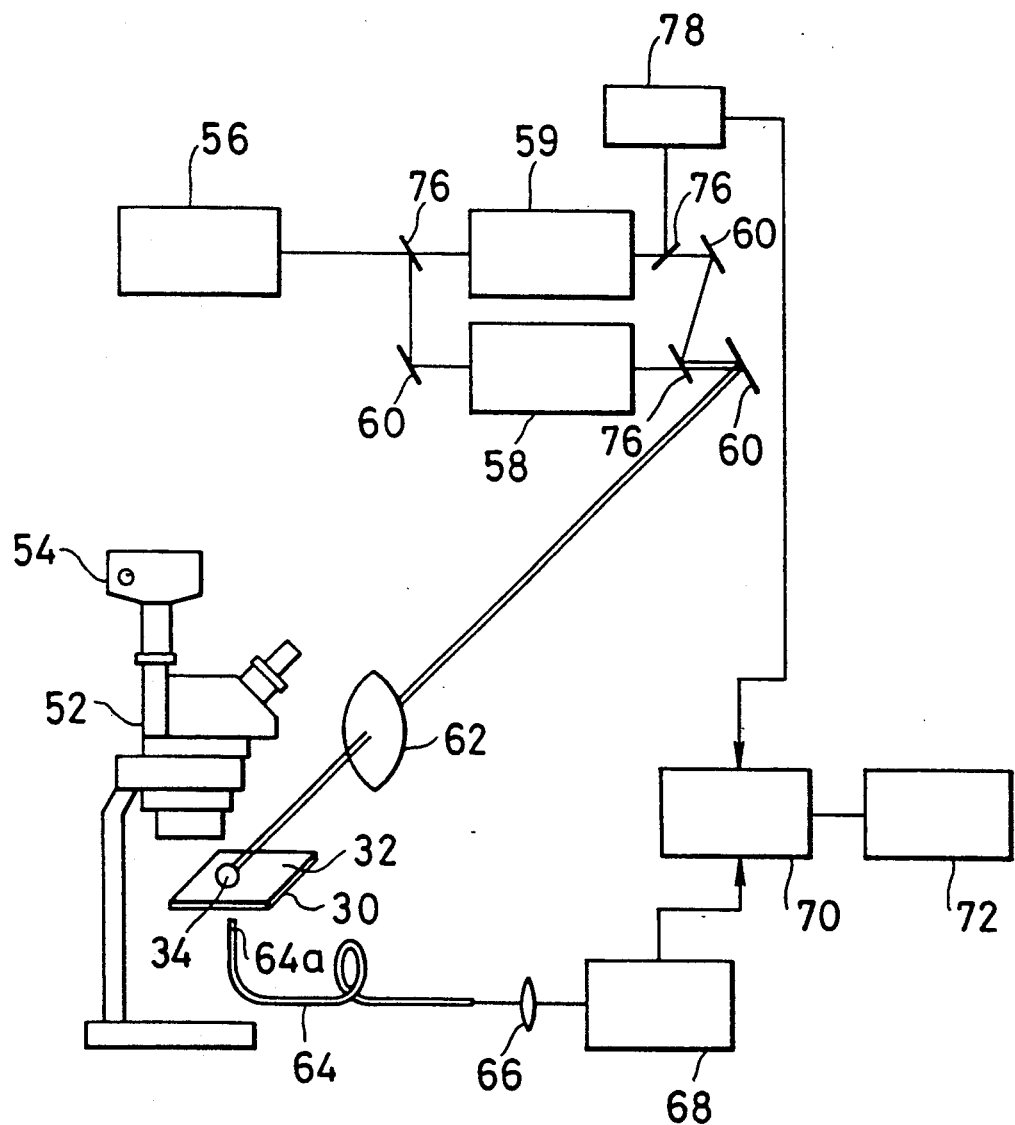
FIG. 17 is a block diagram showing an apparatus for measuring nonlinear optical characteristics, i.e., injection mode locking of a nonlinear optical element of the present invention in Example 4, and light amplification in Example 5.

FIG. 17 is a block diagram showing an apparatus for measuring nonlinear optical characteristics of the element of the present invention. The apparatus shown in FIG. 17 has substantially the same construction as that of the apparatus shown in FIG. 8. Differences are that a dye laser (Rhodamine 610) 59 for emitting a control beam is provided and the pin photodiode 80 is omitted in the apparatus shown in FIG. 17. The dye lasers 58 and 59 are connected parallel to each other and the beam from the excimer laser 56 is split by the beam splitter 76 and introduced into respective dye lasers. The beam emergent from the dye laser 59 can be combined to the beam emergent from the dye laser 58 through the mirror 60 and half mirror 76. Same or like parts or components are indicated by same reference numerals and detailed description thereof is omitted here.

Figure 18A:
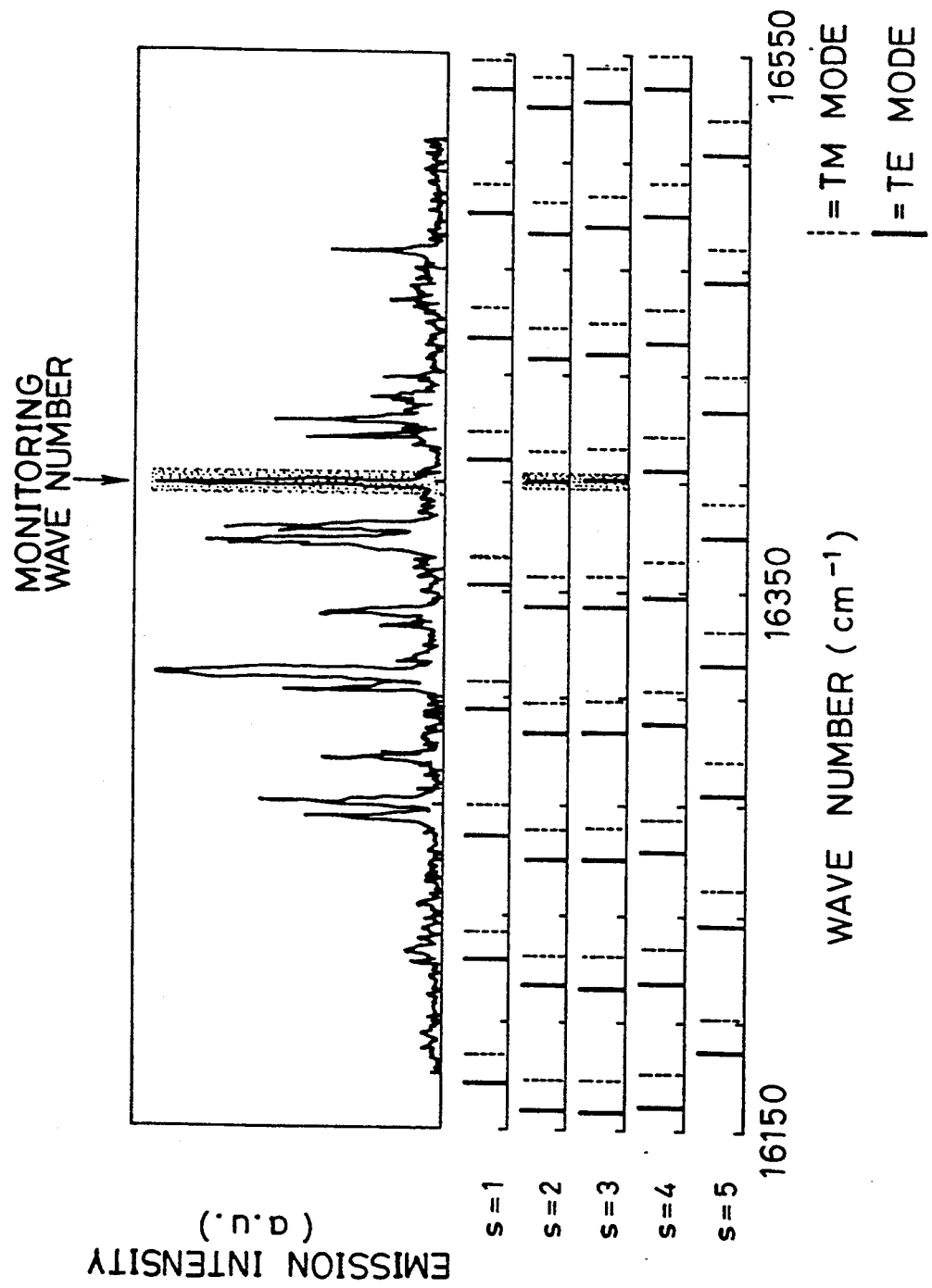
FIG. 18A is a graph illustrating relationship between a laser emission mode (spectrum) and a whispering gallery mode.
Figure 18B:
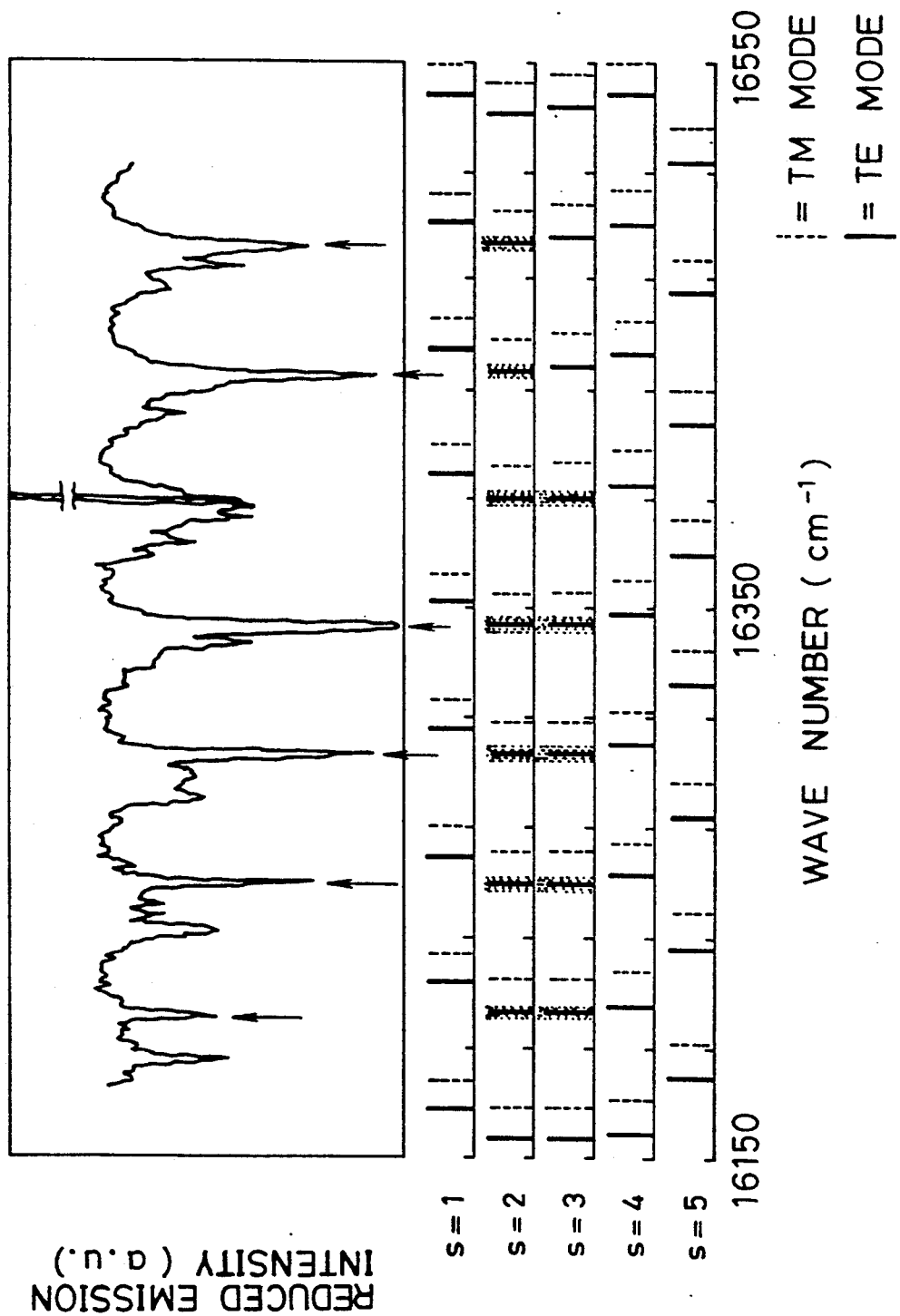
FIG. 18B is a graph illustrating relationship between a change in the intensity of the laser emission and a whispering gallery mode.

An excitation beam with a wavelength of 530 nm was irradiated to the nonlinear optical element, with or without irradiation of a control beam, and light emission modes and whispering gallery modes (estimated from numerical calculation) were obtained. Results obtained are illustrated in FIGS. 18A and 18B. FIG. 18A illustrates relationship between light emission mode and whispering gallery mode when the nonlinear optical element of the present invention was irradiated only with the excitation beam with a wavelength of 530 nm. In FIG. 18A, sharp peaks are observed at wave numbers in the range between 16150 and 16550 (wavelengths: 619 and 604 nm). FIG. 18B illustrates relationship between reduced laser emission intensity at a wave number of 16390 (wavelength: 610 nm) and whispering gallery mode when the nonlinear optical element of the present invention was irradiated with the same excitation beam with a wavelength of 530 nm together with a control beam from the Rhodamine 610 laser 59 with continuously changing the wave number of the control beam from 16150 to 16550 cm$^{-1}$ (wavelength: 619 to 604 nm). The important facts are that the locked modes (modes of reduced laser emission intensities, as indicated by the arrows in FIG. 18B) have the same order numbers, s, as the monitoring wave number (16390 cm$^{-1}$), and that the intervals between the locked modes are regular and periodical. Here, the order number is an index expressing distribution of electromagnetic field in the radial direction of the microsphere. In this example, the order numbers s=2 and s=3 are the same as illustrated in FIGS. 18A and 18B. On or off of the control beam, which results in injection mode locking or recovery therefrom respectively, takes place at a response speed in pico seconds, and hence the nonlinear optical element of the present invention can be used as a high speed optical switch operating at room temperature. The fact that irradiation of the control beam (s=5) with a wave number of 16320 cm$^{-1}$ causes no injection mode locking in the monitoring laser emission modes (s=2, 3) at 16390 cm$^{-1}$, enables irradiation of a plurality of control beams with different wave numbers and following up change (increase/decrease) of light emission peaks in different order numbers, i.e., realization of an optically controllable multiple-mode memory.

EXAMPLE 5

Using the same nonlinear optical element and apparatus for measuring nonlinear optical characteristics as those in Example 4, the following tests were conducted to confirm that the nonlinear optical element of the present invention functions as an optical amplifier.

That is, the Nile Red-containing polystyrene microsphere with a particle diameter of 40 μm was irradiated with an excitation beam with a wavelength of 530 nm to establish light emission (lasing) modes in a wavelength region of 600 to 630 nm, and then a control beam (second excitation beam with a wavelength of 610 nm was irradiated additionally to effect injection mode locking. The intensities of laser emission before and after the irradiation of the control beam were measured and integrated. Taking into consideration the influence of scattering, comparison was made between the integrated laser intensities. The increase in the intensity of laser emission is attributed to partial conversion of spontaneous emission to laser emission. The results show that the nonlinear optical element of the present invention functions as an optical amplifier (photoamplifying element).

Figure 19A:
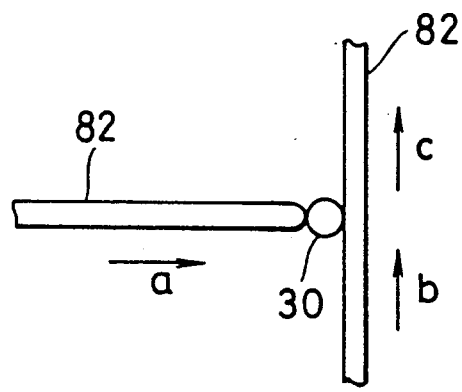
FIGS. 19A, 19B and 19C are schematic partial plan views, respectively, each illustrating connection of a nonlinear optical element of the present invention to optical fibers for achieving injection mode locking or light amplification in Example 5.
Figure 19B:
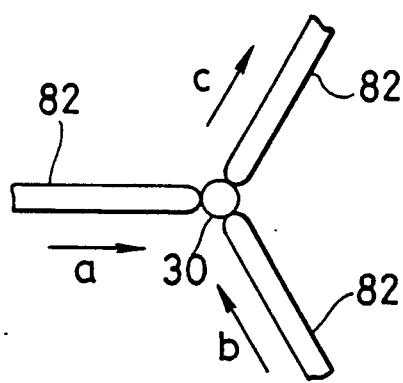
Figure 19C:
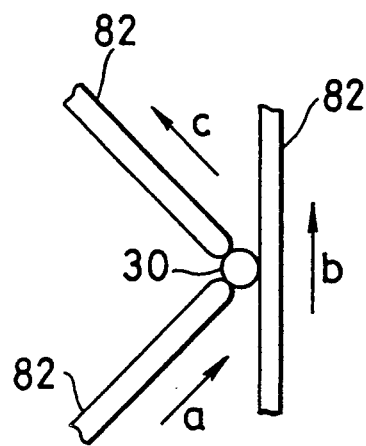

FIG. 19A, 19B and 19C are schematic partial plan views, each illustrating connection of the nonlinear optical element of the present invention with optical fibers for achieving injection mode locking or photoamplifying. In FIGS. 19A, 19B and 19C, the nonlinear optical element 30 is connected to two or more optical fibers 82. Arrows a, b and c indicate the directions of propagation of an excitation beam, a control beam, and signal beam (light emission) after control, respectively. Obviously, the arrangement of network comprising such nonlinear optical element (transparent microsphere) in two or three dimensions enables parallel processing of information.

EXAMPLE 6

A transparent microsphere of silicate glass containing 3% by weight of $Nd_2O_3$ as a nonlinear optical active substance and having a regular spherical shape with a particle diameter of 50 μm and having a smooth surface (refractive index=1.55, transparency=$2 \times 10$ cm$^{-1}$, third nonlinear optical coefficient $\chi^3 = 10^{-20}$ esu or more) was fabricated in a conventional manner, and fixed to a quartz glass substrate in the same manner as in Example 1 to obtain a nonlinear optical element of the present invention.

Then, using the apparatus for measuring nonlinear optical characteristics shown in FIG. 8, a red laser beam from semiconductor laser (power=10 to 100 mW) was irradiated as an excitation beam to the nonlinear optical element. As a result, it was confirmed that lasing in the band of 1062 nm took place.

Similarly, the use of a laser beam with a wavelength of 800 nm band from a red dye laser as an excitation beam resulted in lasing.

Further, another nonlinear optical element was fabricated in the same manner as above except that the transparent microsphere was prepared by using phosphate glass in place of silicate glass. Similar measurement to the above was conducted on this nonlinear optical element, which measurement confirmed that lasing in the band of 1054 nm took place.

Similar tests to those in Example 3 made on the latter nonlinear optical element confirmed that injection mode locking of the laser beam and switching phenomena based thereon took place.

Furthermore, similar measurement to the above was conducted on the silicate glass transparent microspheres and the phosphate glass transparent microspheres with varied particle diameters ranging in the range of from 10 to 100 μm gave similar results to the above.

EXAMPLE 7

Regular spherical, transparent microspheres made of polystyrene containing Nile Red and having a particle diameter of 40 μm (coefficient of variation=2.8%) were prepared in the same manner as in Example 1 and fixed onto a substrate made of glass using an adhesive (solid medium) in the same manner as in Example 1 so that the transparent microspheres were arranged in two dimensions without contacting one another to obtain a nonlinear optical element of the present invention.

To the transparent microspheres constituting the nonlinear optical element was irradiated an excitation beam with a wavelength of 530 nm to establish whispering gallery modes, and in this state a red control beam was irradiated additionally. As a result, a strong reflected wave was observed, which revealed that the nonlinear optical element serves also as a phase conjugate mirror.

EXAMPLE 8

Figure 20:
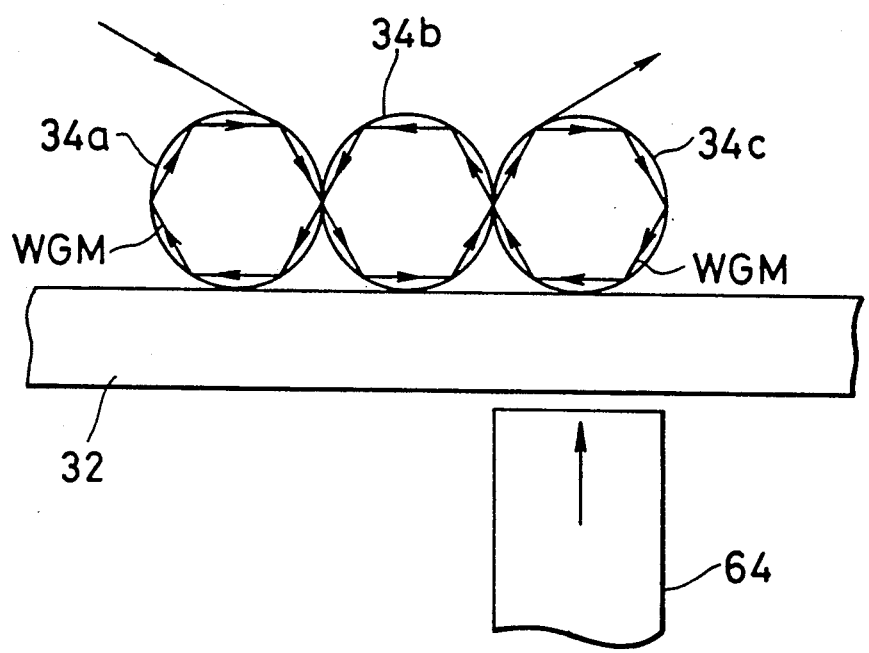
FIG. 20 is a schematic cross sectional view showing a nonlinear optical element of the present invention in Example 8, with illustrating transfer of whispering gallery mode from microsphere to microsphere and enhancement of a laser emission intensity.

Referring to FIG. 20, which is a schematic cross sectional view showing a nonlinear optical element of this example, transmission of whispering gallery mode from microsphere to microsphere and enhancement of emission intensity will be explained.

Three regular spherical, transparent microspheres made of polystyrene containing Nile Red and having a particle diameter of 40 μm (coefficient of variation=2.8%), were prepared in the same manner as in Example 1. The transparent microspheres 34a, 34b and 34c were arranged and fixed onto the substrate 32 made of quartz in the same manner as in Example 1 so that the transparent microspheres 34a, 34b and 34c were arranged in a line with contacting one another to obtain a nonlinear optical element of the present invention in which the nonlinear optical active region is present within the respective transparent microspheres 34a, 34b and 34c.

To the nonlinear optical active region of one of the transparent microspheres that is present on one side of the triplet (left hand side in FIG. 20), i.e., the first transparent microsphere 34a was irradiated an excitation beam with a wavelength of 530 nm to establish whispering gallery modes with wavelengths in the region of 600 to 630 nm not only in the first microsphere 34a but also in the second microsphere 34b, which contacts the first one directly and the third microsphere 34c, which contacts the first microsphere indirectly or via the second microsphere 34b. Irradiation of a control beam with a wavelength in the region of the wavelengths of laser emission through the optical fiber 64 to the third microsphere in the same manner as in Example 5 resulted in the enhancement of the intensity of light emission from the third microsphere 34c.

EXAMPLE 9

Regular spherical, transparent microspheres made of polystyrene containing Nile Red and having particle diameters of 30 μm and 40 μm, respectively, were prepared in the same manner as in Example 1 and fixed onto a substrate made of glass using an adhesive (solid medium) in the same manner as in Example 1 so that the transparent microspheres were arranged with contacting one another to obtain a nonlinear optical element of the present invention.

To the transparent microsphere with a particle diameter of 40 μm was selectively irradiated an excitation beam with a wavelength of 530 nm in the same manner as in Example 1. As a result, it was observed that a part of the whispering gallery modes to be established in the 40 μm-microsphere were transferred into the 30 μm- microsphere, resulting in simplification of the modes. The results show that it is possible to simplify whispering gallery modes using the nonlinear optical element of the present invention having transparent microspheres with different particle diameters. Further, it was confirmed that in a state where whispering gallery modes were established in the respective transparent microspheres with different particle diameters, irradiation of a control beam to one microsphere in the same manner as in Example 3 enabled control of laser emission modes in another microsphere.

Further, irradiation of a control beam with a wavelength (610 μm) corresponding to that of the mode characteristic to one of the transparent microspheres decreased the intensity of light emission with a wavelength (510.5 μm) corresponding to that of the mode characteristic to the other of the transparent microspheres to 10% or less of the intensity without irradiation of the control beam. The results show that connection of transparent microspheres enables coupling of light confinement modes.

Therefore, the nonlinear optical element having the transparent microspheres arranged and fixed unidimensionally, two-dimensionally or three-dimensionally can be utilized in highly directional light sources, short pulsed light sources, etc., based on the modes of a plurality of transparent microspheres and synchronized lasing, and also in optical integrated circuits for signal transmission based on collection or array of transparent microspheres.

EXAMPLE 10

A nonlinear optical element of the present invention with two transparent microspheres with particle diameters of 30 μm and 40 μm, respectively, were prepared in the same manner as in Example 9. The both 30 μm- and 40 μm-microspheres were excited simultaneously in the same manner as in Example 1. As a result, there was observed a multi-mode laser emission more complex than and resulting from coupling of respective laser emission modes characteristic to the respective microspheres. The results show connection of the transparent microspheres one to another enables diversification of light emission modes.

EXAMPLE 11

A transparent microsphere of a silicate glass containing 3% by weight of $Nd_2O_3$ as a nonlinear optical active substance and having a regular spherical shape with a particle diameter of 50 μm and having a smooth surface (refractive index=1.55, transparency=$2\times10$ cm$^{-1}$, third nonlinear optical coefficient $\chi^{(3)}=10^{-20}$ esu or more) was fabricated in a conventional manner, and fixed to a prism made of quartz glass (refractive index: 1.45) using a fluorine-containing photo-setting agent (refractive index: 1.45) in the same manner as in Example 1 to obtain a nonlinear optical element of the present invention.

Then, an excitation beam was irradiated to the nonlinear optical element using a red semiconductor laser as the excitation beam source and selecting the wavelength of the excitation beam such that transparency of neodymium glass was 20 cm$^{-1}$ or higher, and absorption intensity of $Nd^{3+}$ion was 0.5 to 50% of the absorption intensity at $\lambda_{max}$. The intensities of absorption spectra were measured using the apparatus for measuring nonlinear optical characteristics shown in FIG. 8. As a result, optical bistability depending on the intensity of the excitation beam was observed, which shows that the nonlinear optical element of the present invention can function as an intrinsic optically bistable element.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A nonlinear optical element based on photoconfinement effect in a microspherical cavity, comprising:
    (a) a substrate;
    (b) at least one transparent microsphere having a particle diameter of 1 to 200 μm suitable for establishing whispering gallery mode, the at least one transparent microsphere having a surface and fixed to said substrate;
    (c) at least one nonlinear optical active region associated with said at least one transparent microsphere; and
    (d) at least one light reflection region associated with said at least one transparent microsphere, the at least one light reflection region having an interface and at least a part of the at least one interface being common with the surface of said at least one transparent microsphere.

2. A nonlinear optical element as claimed in claim 1, wherein said nonlinear optical active region is in said at least one transparent microsphere, and wherein said at least one transparent microsphere is made of a nonlinear optical active substance system.

3. A nonlinear optical element as claimed in claim 2, wherein said nonlinear optical element further comprises a solid medium, through which said at least one transparent microsphere is fixed to said substrate.

4. A nonlinear optical element as claimed in claim 3, wherein said solid medium has arranged therein said at least one transparent microsphere.

5. A nonlinear optical element as claimed in claim 4, wherein said solid medium has a plurality of said transparent microspheres arranged unidimensionally.

6. A nonlinear optical element as claimed in claim 4, wherein said solid medium has a plurality of said transparent microspheres arranged two-dimensionally.

7. A nonlinear optical element as claimed in claim 4, wherein said solid medium has a plurality of said transparent microspheres arranged three-dimensionally.

8. A nonlinear optical element as claimed in claim 2, wherein said nonlinear optical element has a plurality of said transparent microspheres optically connected through an optical medium one to another.

9. A nonlinear optical element as claimed in claim 1, further comprising a solid medium, wherein said nonlinear optical active region is occupied by said solid medium, and wherein said solid medium is made of a nonlinear optical active substance system, said solid medium contacting at least a part of the surface of said at least one transparent microsphere.

10. A nonlinear optical element as claimed in claim 9, wherein said solid medium contains said at least one transparent microsphere.

11. A nonlinear optical element as claimed in claim 10, wherein said solid medium contains a plurality of said transparent microspheres arranged unidimensionally.

12. A nonlinear optical element as claimed in claim 10, wherein said solid medium contains a plurality of said transparent microspheres arranged two-dimensionally.

13. A nonlinear optical element as claimed in claim 10, wherein said solid medium contains a plurality of said transparent microspheres arranged three-dimensionally.

14. A nonlinear optical element as claimed in claim 9, wherein said nonlinear optical active region is a shell-like layer covering the surface of said transparent microsphere concentrically thereto.

15. A nonlinear optical element as claimed in claim 1, wherein said at least one nonlinear optical active region has a third-order harmonic nonlinear optical coefficient $\chi^{(3)}$ of $10^{(-13)}$ esu or more.

16. A nonlinear optical element as claimed in claim 15, wherein said at least one transparent microsphere has a particle diameter of 10 to 100 $\mu$m.

17. A nonlinear optical system based on photoconfinement effect in a microspherical cavity, comprising:
   (1) an excitation beam source; and
   (2) a nonlinear optical element optically connected to said excitation beam source, said nonlinear optical element comprising:
      (a) a substrate;
      (b) at least one transparent microsphere having a particle diameter of 1 to 200 $\mu$suitable for establishing whispering gallery mode, the at least one transparent microsphere having a surface and fixed to said substrate;
      (c) at least one nonlinear optical active region associated with said at least one transparent microsphere; and
      (d) at least one light reflection region associated with said at least one transparent microsphere, the at least one light reflection region having an interface and at least a part of the at least one interface being common with the surface of said at least one transparent microsphere.

18. A nonlinear optical system as claimed in claim 17, further comprising:
   (3) a control beam source optically connected to said nonlinear optical element.

19. A method of amplifying a light, comprising the steps of:
   (1) providing an excitation beam source, and a nonlinear optical element based on photoconfinement effect in a microspherical cavity, and optically connected to said excitation beam source, said nonlinear optical element comprising:
      (a) a substrate;
      (b) at least one transparent microsphere having a particle diameter of 1 to 200 $\mu$m suitable for establishing whispering gallery mode, the at least one transparent microsphere having a surface and fixed to said substrate;
      (c) at least one nonlinear optical active region associated with said at least one transparent microsphere; and
      (d) at least one light reflection region associated with said at least one transparent microsphere, the at least one light reflection region having an interface and at least a part of the at least one interface being common with the surface of said at least one transparent microsphere;
   (2) irradiating an excitation beam from said excitation beam source to said nonlinear optical element to introduce said excitation beam into said at least one nonlinear optical active region to emit a beam in the at least one nonlinear optical active region; and
   (3) repeatedly reflecting said beam in the at least one light reflection region.

20. A method of amplifying light as claimed in claim 19, wherein said at least one nonlinear optical active region is outside said at least one transparent microsphere.

21. A method of amplifying light as claimed in claim 19, said at least one nonlinear optical active region is common with said at least one light reflection region.

22. A method of amplifying light as claimed in claim 21, wherein said common region is inside said at least on transparent microsphere.

23. A method of amplifying light as claimed in claim 21, wherein said common region is a shell-like layer provided on the surface of said at least one transparent microsphere concentric thereto.

24. A method of amplifying light as claimed in claim 19, further comprising the step of:
   (4) irradiating, to said at least one nonlinear optical region, a control beam with a specified wavelength in a wavelength region equivalent to that of said beam, thereby enhancing the light emission intensity of said at least one transparent microsphere.

25. A method of injection mode locking, comprising the steps of:
   (1) providing an excitation beam source, and a nonlinear optical element based on photoconfinement effect in a microspherical cavity, and optically connected to said excitation beam source, said nonlinear optical element comprising:
      (a) a substrate;
      (b) at least one transparent microsphere having a particle diameter of 1 to 200 $\mu$m suitable for establishing whispering gallery mode, the at least one transparent microsphere having a surface and fixed to said substrate;
      (c) at least one nonlinear optical active region associated with said at least one transparent microsphere; and
      (d) at least one light reflection region associated with said at least one transparent microsphere, the at least one light reflection region having an interface and at least a part of the at least one interface being common with the surface of said at least one transparent microsphere;
   (2) irradiating an excitation beam from said excitation beam source to said nonlinear optical element to introduce said excitation beam into said at least one nonlinear optical active region to emit a beam in the at least one nonlinear optical active region;
   (3) repeatedly reflecting said beam in said at least one light reflection region to cause a laser emission; and
   (4) irradiating, to said at least one nonlinear optical region, a control beam in a monitoring mode with a specified wavelength in a wavelength region equivalent to that of said laser beam, thereby enhancing the laser emission intensity of said at least one transparent microsphere to cause injection mode locking at an order number equivalent to that of said monitoring mode.

26. A method of optical switching, comprising the steps of:
   (1) providing an excitation beam source, and a nonlinear optical element based on photoconfinement effect in a microspherical cavity, and optically connected to said excitation beam source, said nonlinear optical element comprising:
(a) a substrate;
(b) at least one transparent microsphere having a particle diameter of 1 to 200 μm suitable for establishing whispering gallery mode, the at least one transparent microsphere having a surface and fixed to said substrate;
(c) at least one nonlinear optical active region associated with said at least one transparent microsphere; and
(d) at least one light reflection region associated with said at least one transparent microsphere, the at least one light reflection region having an interface and at least a part of the at least one interface being common with the surface of said at least one transparent microsphere;
(2) irradiating an excitation beam from said excitation beam source to said nonlinear optical element to introduce said excitation beam into said at least one nonlinear optical active region to emit a beam in the at least one nonlinear optical active region;
(3) repeatedly reflecting said beam in said at least one light reflection region to cause a laser emission;
(4) irradiating, to said at least one nonlinear optical region, a control beam in a monitoring mode with a specified wavelength in a wavelength region equivalent to that of said laser beam, thereby enhancing the laser emission intensity of said at least one transparent microsphere to cause injection mode locking at an order number equivalent to that of said monitoring mode; and
(5) rendering said control beam on or off.

27. A method of coupling whispering gallery modes, comprising the steps of:
(1) providing an excitation beam source, and a nonlinear optical element based on photoconfinement effect in a microspherical cavity, and optically connected to said excitation beam source, said nonlinear optical element comprising:
(a) a substrate;
(b) a plurality of transparent microsphere each having a particle diameter of 1 to 200 μm suitable for establishing whispering gallery mode and each having a surface and fixed to said substrate;
(c) at least one nonlinear optical active region associated with said at least one transparent microsphere; and
(d) a plurality of light reflection regions associated with said plurality of transparent microspheres, each of said plurality of light reflection regions having an interface, at least a part of each of said interface being common with the surface of each of said transparent microspheres;
(2) irradiating an excitation beam from said excitation beam source to said nonlinear optical element to introduce said excitation beam into said at least one nonlinear optical active region to produce at least one beam; and
(3) repeatedly reflecting said at least one beam in said light reflection regions, respectively.

28. A method of coupling whispering gallery modes as claimed in claim 27, further comprising the step of:
(4) irradiating, to said at least one nonlinear optical active region, a control beam with a specified wavelength equivalent to that characteristic to one of said plurality of transparent microspheres, thereby controlling said whispering gallery modes.

* * * * *

UNITED STATES PATENT AND TRADEMARK OFFICE
CERTIFICATE OF CORRECTION

PATENT NO. : 5,231,533
DATED : July 27, 1993
INVENTOR(S) : Makoto GONOKAMI et al.

It is certified that error appears in the above-indentified patent and that said Letters Patent is hereby corrected as shown below:

Item [57],
Abstract, Title Page, line 1, change "sunstrate" to --substrate--.

Claim 17, column 23, line 28, change "$\mu$suitable" to --$\mu$m suitable--.

Claim 22, column 24, line 14, change "on" to --one--.

Claim 27, column 26, line 9, change "microsphere" to --microspheres--.

Signed and Sealed this

Nineteenth Day of July, 1994

Attest:

BRUCE LEHMAN

*Attesting Officer*  Commissioner of Patents and Trademarks